US009107058B2

(12) United States Patent
Inha et al.

(10) Patent No.: US 9,107,058 B2
(45) Date of Patent: Aug. 11, 2015

(54) METHOD AND APPARATUS FOR EMERGENCY PHONE IN A VEHICLE KEY

(71) Applicant: Nokia Corporation, Espoo (FI)

(72) Inventors: Kai Allan Inha, Jarvenpaa (FI); Ronald James Webb, Espoo (FI); Marko Tapio Tuukkanen, Schlenzer (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 19 days.

(21) Appl. No.: 13/858,485

(22) Filed: Apr. 8, 2013

(65) Prior Publication Data

US 2014/0302810 A1 Oct. 9, 2014

(51) Int. Cl.

| | |
|---|---|
| ***H04M 11/04*** | (2006.01) |
| ***H04W 4/22*** | (2009.01) |
| ***H04M 1/725*** | (2006.01) |
| ***H04W 4/00*** | (2009.01) |

(52) U.S. Cl.

CPC ............ *H04W 4/22* (2013.01); *H04M 1/72538* (2013.01); *H04M 1/72569* (2013.01); *H04W 4/005* (2013.01)

(58) Field of Classification Search

CPC . H04W 76/007; H04W 4/22; H04M 1/72519; G04B 17/06
USPC .................. 455/404.1, 404.2, 550.1; 340/584
See application file for complete search history.

(56) References Cited

U.S. PATENT DOCUMENTS 6,587,040 B2 * 7/2003 Seto .......................... 340/426.1
8,331,338 B2 12/2012 Stahlin et al.
2002/0041240 A1 * 4/2002 Ikeda et al. .................. 340/993
2002/0137489 A1 9/2002 Dutta et al.
2003/0216134 A1 * 11/2003 Mutoh ...................... 455/404.1
2006/0030349 A1 * 2/2006 Fabian et al. ................ 455/521
2010/0317314 A1 12/2010 Roland
2011/0177791 A1 7/2011 Stahlin et al.
2011/0237217 A1 * 9/2011 Monks et al. ............. 455/404.1
2011/0298613 A1 * 12/2011 Ben Ayed ............... 340/539.11
2012/0154157 A1 * 6/2012 George ........................ 340/584

FOREIGN PATENT DOCUMENTS

DE 10 2005 021 115 A1 11/2006
DE 10 2007 042 111 A1 3/2009
EP 1 575 323 A1 9/2005
EP 1 814 093 A1 8/2007

(Continued)

OTHER PUBLICATIONS

Alibaba.com "unlocked GSM bmw car key mobile phone M6," web page, retrieved from http://www.alibaba.com/product-gs/654082510/unlocked_GSM_bmw_car_key_mobile.html on Jul. 8, 2013, pp. 1-3.

(Continued)

*Primary Examiner* — Danh Le

(74) *Attorney, Agent, or Firm* — Ditthavong & Steiner, P.C.

(57) ABSTRACT

An approach is provided for placing an emergency call using a key. The key platform processes and/or facilitates a processing of sensor information to determine at least one emergency condition. Then, the key platform causes, at least in part, an initiation of at least one emergency call via at least one key in response to the at least emergency condition, wherein the at least one key is configured with one or more emergency phone functionalities.

16 Claims, 19 Drawing Sheets

(56) References Cited

FOREIGN PATENT DOCUMENTS

| | | | |
|---|---|---|---|
| EP | 1 826 734 | A1 | 8/2007 |
| EP | 2 523 479 | A1 | 11/2012 |
| FR | 2 891 687 | A1 | 4/2007 |
| JP | 2004161121 | A | 6/2004 |
| WO | 2005/064904 | A1 | 7/2005 |
| WO | 2007/075646 | A2 | 7/2007 |
| WO | 2009/083698 | A2 | 7/2009 |

OTHER PUBLICATIONS

Deutsche Telekom AG, Intelligent car key in a cell phone, web page, retrieved from http://www.telekom.com/innovation/connectedcar/81840 on Jul. 8, 2013, 1 page.

Extended European Search Report for corresponding European Application No. 14162608.5, dated Jun. 20, 2014, 6 pages.

* cited by examiner

300
START
301
DETERMINE EMERGENCY CONDITION
303
DETERMINE VEHICLE EMERGENCY SYSTEM
305
AVAILABLE?
NO
YES
307
INITIATE EMERGENCY CALL FROM KEY
309
DETERMINE AT LEAST ONE MAIN DEVICE TO INITIATE THE CALL
END

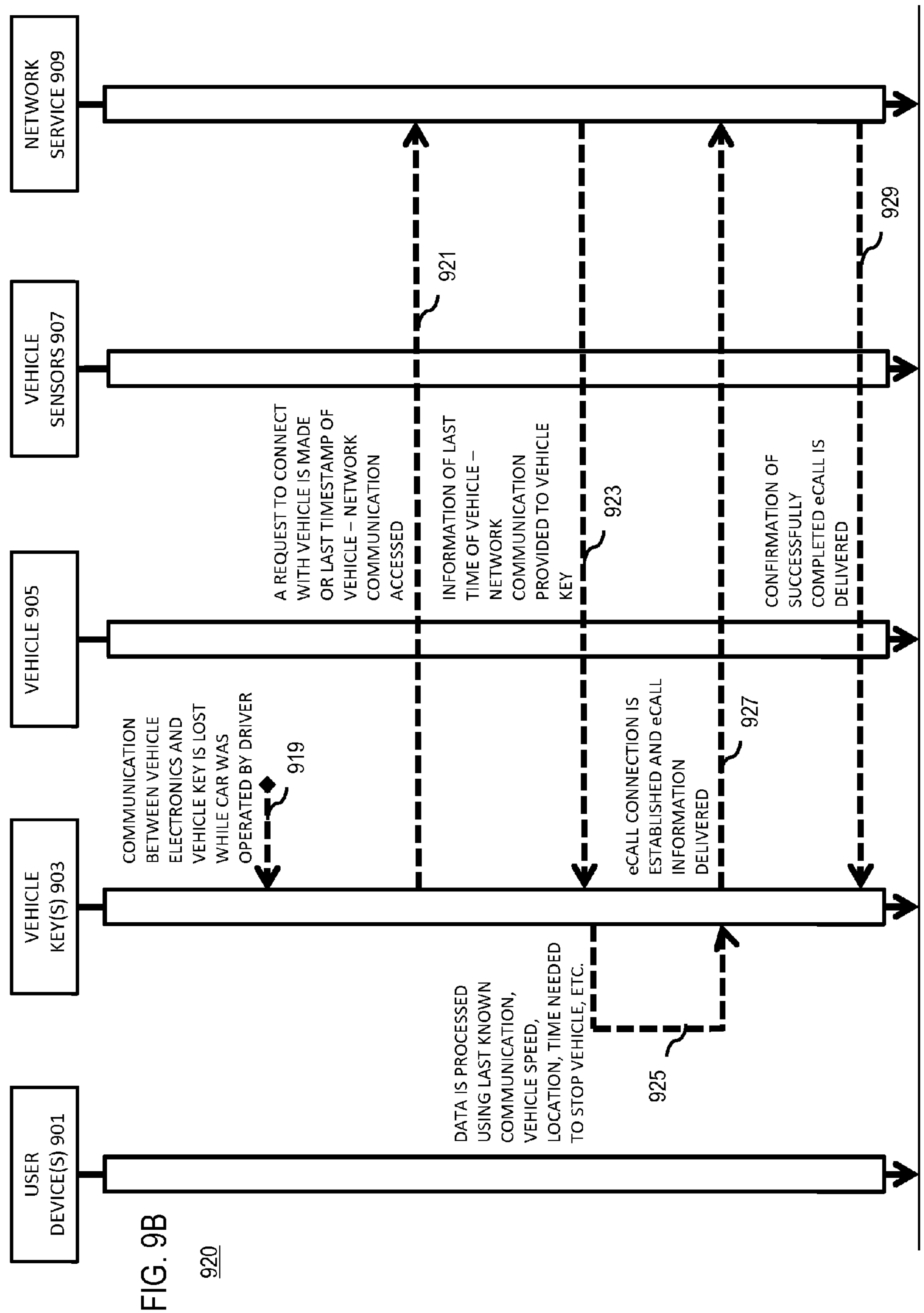

FIG. 9B
920
USER DEVICE(S) 901
VEHICLE KEY(S) 903
VEHICLE 905
VEHICLE SENSORS 907
NETWORK SERVICE 909
COMMUNICATION BETWEEN VEHICLE ELECTRONICS AND VEHICLE KEY IS LOST WHILE CAR WAS OPERATED BY DRIVER
919
A REQUEST TO CONNECT WITH VEHICLE IS MADE OR LAST TIMESTAMP OF VEHICLE – NETWORK COMMUNICATION ACCESSED
921
INFORMATION OF LAST TIME OF VEHICLE – NETWORK COMMUNICATION PROVIDED TO VEHICLE KEY
923
DATA IS PROCESSED USING LAST KNOWN COMMUNICATION, VEHICLE SPEED, LOCATION, TIME NEEDED TO STOP VEHICLE, ETC.
925
eCALL CONNECTION IS ESTABLISHED AND eCALL INFORMATION DELIVERED
927
CONFIRMATION OF SUCCESSFULLY COMPLETED eCALL IS DELIVERED
929

METHOD AND APPARATUS FOR EMERGENCY PHONE IN A VEHICLE KEY

BACKGROUND

Service providers, device manufacturers (e.g., wireless, cellular, etc.) and vehicle manufacturers are continually challenged to deliver value and convenience to consumers in the form of new products, or as example, by providing compelling network services. One area of interest has been the development of automatic calls in response to emergencies (referred to herein as eCalls). These development efforts have been spurred by governmental and other standardization bodies that have been investigating and promoting common standards for eCalls. One example of an eCall mechanism is the European Union's eCall initiative to implement automatic emergency call mechanisms in vehicle, with the aim of the mechanism becoming a global standard. As a result, service providers, device and vehicle manufacturers face significant challenges to developing mechanisms that are highly available and reliable in emergency situations (e.g., automobile accidents, health emergencies, and the like), while also leveraging the use of existing or commonly available devices that can be configured to include call functionality (e.g., keys). While the intention of European Union's eCall initiative is to create a standard for eCall and mandate the implementation of emergency call mechanism in new vehicles, the mechanism could be damaged in an emergency situations and failing to fulfill its purpose.

SOME EXAMPLE EMBODIMENTS

Therefore, there is a need for an approach for placing an emergency call using a key.

According to one embodiment, a method comprises processing and/or facilitating a processing of sensor information to determine at least one emergency condition. The method also comprises causing, at least in part, an initiation of at least one emergency call via at least one key in response to the at least one emergency condition, wherein the at least one key is configured with one or more emergency phone functionalities.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of sensor information to determine at least one emergency condition. The apparatus is also caused to cause, at least in part, an initiation of at least one emergency call via at least one key in response to the at least one emergency condition, wherein the at least one key is configured with one or more emergency phone functionalities.

According to another embodiment, a computer-readable storage medium carries one or more sequences of one or more instructions which, when executed by one or more processors, cause, at least in part, an apparatus to process and/or facilitate a processing of sensor information to determine at least one emergency condition. The apparatus is also caused to cause, at least in part, an initiation of at least one emergency call via at least one key in response to the at least one emergency condition, wherein the at least one key is configured with one or more emergency phone functionalities.

According to another embodiment, an apparatus comprises means for processing and/or facilitating a processing of sensor information to determine at least one emergency condition. The apparatus also comprises means for causing, at least in part, an initiation of at least one emergency call via at least one key in response to the at least one emergency condition, wherein the at least one key is configured with one or more emergency phone functionalities.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the vehicle side or on the mobile device side or in any shared way between service provider, vehicle and mobile device with actions being performed on all sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for placing an emergency call using a key are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
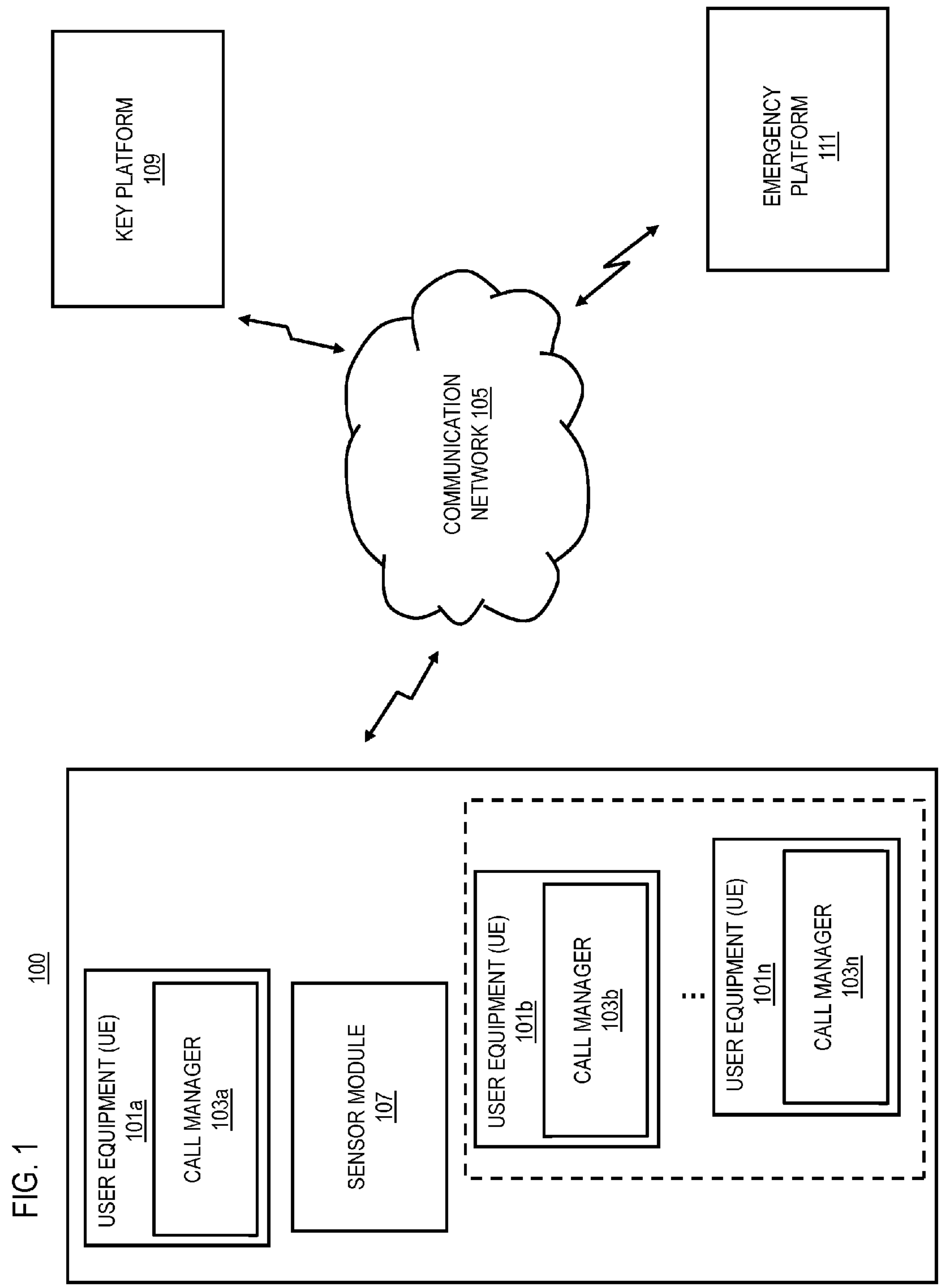
FIG. 1 is a diagram of a system capable of placing an emergency call using a key, according to one embodiment.

FIG. 1 is a diagram of a system capable of placing an emergency call using a key, according to one embodiment. As noted above, governmental agencies and standardization bodies increasingly recognize the importance of emergency calling or eCalling for ensuring public safety. For example, eCall is a European initiative to implement automatic eCall mechanisms in vehicles. As used herein, the term, "vehicle" refers to a mobile machine for transporting people or goods, including a car, truck, bus, motorcycle, scooter, tractor, boat, ship, aircraft, etc. It is noted that although various embodiments are described with respect to the European eCall initiative, it is contemplated that the various embodiments are applicable to any other eCalling standard as well as to the initiating of automatic calls using multiple devices in the absence of an emergency.

In one implementation of eCall, an eCall device integrated with a vehicle (e.g. GM OnStar) may automatically initiate an emergency call upon sensing a vehicle emergency or accident. eCalls and other eCalling efforts are projected to reduce vehicular accident response time by about 50% in rural areas and 40% in urban areas. In doing so, eCall functionality is expected to save lives and reduce the severity of injuries. By way of example, the eCall initiative aims to have eCalling available as a standard such that all vehicles will automatically place an emergency call, alerting nearby emergency agencies to the emergency location (e.g., Global Positioning System (GPS) coordinates), establishing voice communication in the event of a sensor-detected emergency, and the like. Detecting an accident may include sensors detecting emergency situations, including airbag deployment, acceleration sensors, etc. In one embodiment, vehicles are equipped with telematics technology including in-vehicle systems, wireless data delivery, and public safety answering point systems to facilitate emergency action. In placing the call, the eCall may notify the nearest emergency center and establish a voice connection, video connection, and/or deliver a "minimum data set" including the location of the emergency and information associated with the vehicle. In one embodiment, users may manually initiate eCalls by pushing a button. Alternately, the eCall mechanism may automatically place an eCall upon emergency detection.

However, one problem with eCall and other similar eCalling approaches is the use of dedicated hardware components that typically are fixed or equipped with a vehicle. Consequently, it will generally be only those users who have the vehicles equipped with eCalling equipment built into their vehicles who can benefit from eCalling. For example, while the European eCall initiative aims to make eCalling mandatory in all new vehicles by 2015, there will remain, for at least a considerable period of time, a significant population of older vehicles that will not be so equipped. Vehicle manufacturers face significant challenges in equipping older vehicles with eCalling capability. Additionally, vehicle manufacturers may face challenges in adhering to the European eCall initiative while minding consumer expectations. For example, equipping entire cars with eCall capability adds to the cost of the standard car. Vehicle manufacturers may face challenges in outfitting new vehicles with eCalling equipment, while keeping costs and price ranges comparable to previous price ranges. Plus, integrating eCalling capability directly into vehicles may limit or impair vehicle function when only the eCalling equipment requires repair or updates. Consumers may not welcome the hassle of not being able to use their vehicles when only eCalling portions of the vehicles require repair. Moreover, emergency situations may arise when operating away from a vehicle. Accordingly, tying emergency calling capabilities to dedicated hardware or fixed mounted solutions can be problematic.

Furthermore, vehicle systems may be susceptible to damage during accidents. For example, the hardware (e.g., transmitters, antennas, etc.) can be rendered inoperable by physical damaged sustained by a vehicle during a crash. In some cases, even if the equipment remains operable, performance can be significantly decreased by damage. For example, an antenna or a portion of an antenna can be destroyed so that communication range, power consumption, etc. can significantly reduce the capabilities of the eCalling system. Moreover, the performance of an eCalling mechanism or system can be particularly important in light of the critical nature of the establishing and maintaining an emergency quickly and reliably after an emergency has occurred. In many emergency situations, initiating a call as quickly as possible after an emergency can ensure that emergency responders will be able to reach the emergency quickly.

To address this problem, a system 100 of FIG. 1 introduces the capability to place emergency calls using a key. Updating keys may permit easier implementation of eCalling capability to currently existing vehicles than changing entire vehicle systems. In one embodiment, the system 100 may embed in a key, Global system for Mobile Communications (GSM) or similar phones to provide the "call 911" experience that a phone embedded in a vehicle would provide. The key could connect to vehicle systems, for example, by Near Field Communication (NFC), Bluetooth, and/or MirrorLink services to access vehicle systems data. The key may further contact one or more cloud services for vehicle systems data. In a further embodiment, the key may transfer vehicle systems data to the cloud service. Such data may include vehicle model, license information, insurance policies associated with the vehicle, location, recalls associated with the vehicle, or a combination thereof. In the case of an accident, the key may then initiate the emergency call and transmit the accessed vehicle systems data.

In one embodiment, the key may determine an accident and initiate the emergency call based on connectivity between the key and a vehicle system. For example, the key may enter a short range communication network within a vehicle system, either by being inserted into the ignition or simply in proximity with the vehicle. The key may then continuously verify its connection with the vehicle and monitor vehicle information such as speed, location, gas level, etc. For example, the system 100 may include initial verification of key presence, followed by forming an association between the key and vehicle in order to determine connectivity between the key and vehicle. The association may include a radio frequency (RF) memory tag and a key peer element. The system may continually monitor the surrounding proximity for other devices and monitor changes in those devices relative to the key.

Should connectivity suddenly break or a change in proximity with other devices change, the key may note the changed status and interpret the break in connectivity or change in proximity as an indication of a vehicle accident or the vehicle being unresponsive. Upon receiving such indication, the key may automatically initiate an emergency call or request verification of status from the vehicle, a user, other associated mobile devices, a network service, or a combination thereof. Alternately, the key may determine an accident based on various sensors associated with a vehicle or associated devices. For example, the sensors may coincide with an emergency condition to request a device to place an emergency call. In one such case, sensors may include sensors to detect vehicle emergencies, including vehicle airbag deployment, rapid acceleration or deceleration, sudden engine stop, or some combination thereof. In another case, sensors may be associated with physiological aberrations, including sudden change in heart rate, heart failure, etc. In one embodiment, the sensors would detect an emergency condition, alert all the devices validated as part of the network (including the key), then select the device with the best reception and battery power to initiate an emergency call. In such a case, the potential network may be formed previously, as given in the paragraph above, or initiated upon signals from the sensors. The latter case where the network is not initiated until detection of an emergency from the sensors, may save battery or other resources of the devices.

In one embodiment, key connectivity may include connectivity to a network-based navigation or map service. The network service may help distinguish between losses of connectivity attributable to location or structures, versus losses of connectivity due to emergency conditions. For example, connectivity for vehicles and mobile devices are often lost in high building, mountains, or tunnels. Configuring keys with connectivity to mapping network services enable the system 100 to determine where connectivity loss might be based on location rather than an accident. For example, where a vehicle loses connectivity with the network service, the network service may contact the key. If the key is still in connectivity with the car and network service, the network service may interact with the key to determine whether an accident has occurred and where the accident might have occurred.

In another embodiment, the network service could trigger an eCall based on the loss of connection to both the key and vehicle. For example, if connectivity is lost where known map or location data indicates connectivity ought to be good, the system 100 may automatically initiate an eCall. For example, the network service may default to the last known location of the key and vehicle and determine that the key and vehicle are proximate the last location. Then for the eCall, the network service may direct emergency personnel to the last location. In another example, the network service may further monitor other characteristics of a vehicle, for instance, vehicle speed. Then, the network service may provide an estimate of vehicle location after loss of connectivity, given the last known location, vehicle speed, and the time past between the loss of connectivity and when the last known location was determined.

In one embodiment, the system 100 may then select one of the connected devices to place the emergency call. In one embodiment, one of the connected devices may be selected should a fixed or proprietary system be incapacitated to place the call. For instance, the system 100 may select a mobile phone inside a vehicle to place an eCall where the vehicle's dedicated or proprietary eCalling system is unavailable or inactive due to a collision or power outage. In another embodiment, the system 100 selects one of the connected devices, including the fixed or proprietary system and key, depending on which has the best resources to make the eCall. For example, even if a vehicle's OnStar system is available, the system 100 may select the key to place the call.

In a further embodiment, the system 100 may augment the eCall with other relevant information. For example, the system 100 may include the key outfitted with at least a speaker, microphone, or combination thereof to establish a voice connection. In another instance, the call may include transmission of data, including vehicle information, user health information, location information, or a combination thereof. In other words, the system 100 may transmit the make and model of the vehicle involved in an emergency, the vehicle identification number (VIN) the identity of a user associated with the vehicle or mobile device, medical history of the user, location information, or a combination thereof. In one scenario, a key may be associated with particular vehicle information and/or user health information including medical history or medication allergies. In another scenario, a single key may apply to multiple vehicles so that one key with personal settings may be used to start vehicles within a preconfigured group.

In one embodiment, the key may include a button to place an emergency call. For example, a user may push the button, whereupon the key may automatically send vehicle location to an emergency response center. In another embodiment, the key may include a user interface with more functions, such as another option signaling a sign such as, "I am alive" so that the response team has indication of the extent of the accident. Alternately, the call may include the talking functions as previously discussed.

Regarding location information, the key may continuously receive location and other sensor data from vehicle systems (via the NFC or Bluetooth communications). Such information may include Global Positioning System (GPS) data taken from the vehicle systems if the key is in close communication with the vehicle. Alternately, the key may determine location data from cellular information, including location provided by cellular identification.

In another embodiment, the key may cause storage of the above information associated with a vehicle, including telematics information associated with an emergency condition. For example, the key may store telematics starting from detecting connectivity with a vehicle system. Since keys are naturally not integral to the vehicle, the rescue personnel or investigators may easily remove the key from the accident site. Then, the key could contain the latest data of the situation prior to the accident. Such data may then be extracted for further study.

Furthermore, the key may operate outside the vehicle, similar to current "panic key" functions. For example, system 100 may cause the key to initiate an emergency call itself, independent of a vehicle system. Location data may be the cellular identification or GPS data from the vehicle systems. For example, a user may escape from a burning vehicle and still prompt an emergency call simply by extracting the key. The portability of the key allows for emergency call functionality separate from a vehicle system where the vehicle system and/or devices connected with the vehicle are incapacitated.

In one embodiment, the system 100 may further include specific key holders that may shield the key from damage in event of an accident and/or provide additional functionality. For example, the holders may charge a key battery, provide wireless connection for the key to charge when it is in contact with the particular holder as a dedicated charging location, and/or provide additional sensory input.

As shown in FIG. 1, the system 100 comprises a user equipment (UE) 101 having connectivity to one or more UEs 101*b*-101*n* (collectively UEs 101), a sensor module 107, a key platform 109, and an emergency platform 111 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In a further embodiment, the UE 101*a* may include the vehicle system where the UEs 101*b*-101*n* include mobile devices associated with the UE 101*a*, for example via a short range communication network inside a vehicle. In other words, an automatic emergency call mechanism supported by a vehicle may serve as UE 101*a*. Call manager 103*a* may be in connectivity with the sensor module 107 such that sensor module 107 may relay a request to call manager 103*a* to initiate at least one call from UE 101*a* when sensors associated with the sensor module 107 detect a scenario associated with call initiation. For example, sensors associated with the sensor module 107 may detect an emergency condition and trigger the call manager 103*a* to make an emergency call. In another embodiment, the call manager 103*a* may initiate connectivity with one or more other UEs 101*b*-101*n*. For example, the one or more other UEs 101*b*-101*n* may include mobile devices associated with passengers in the vehicle denoted as UE 101*a*. After initiating connectivity, the call managers 103*a*-103*n* may determine to select at least one main device out of the connected at least one UE 101*a* and one or more other UEs 101*b*-101*n* that may ultimately place the emergency call initiated by sensor module 107.

In one embodiment, the key platform 109 may include the key with eCall capability, where the call managers 103*a*-103*n*, sensor module 107, or a combination thereof may cause the key platform 109 to initiate a call. In one embodiment, the key platform 109 may receive and store sensor information from the sensor module 107. In another embodiment, the key platform 109 may support calling functions, such as voice capability for a user to communicate with an emergency response team.

In one embodiment, the emergency platform 111 may receive calls from the call managers 103*a*-103*n* or the key platform 109. In one embodiment, the emergency platform 111 may initiate, from the key platform 109, extraction of sensor data immediately preceding an accident. In another embodiment, the emergency platform 111 may initiate retrieval of sensor data from the sensor module 107 or key platform 109, even if the call is placed from a UE 101 other than the key platform 109.

In one embodiment, the sensor module 107 makes the determination of the emergency conditions and triggers the key platform 109 to make the call. For example, the sensor module 107 may receive all the vehicle system sensor data and simply implement the emergency call from the key platform 109. Alternately, the key platform 109 may determine the emergency condition, for example, with determining lack of connectivity or disengagement from the vehicle system. In such cases, both the sensor module 107 and key platform 109 may have separate or overlapping sensor input. For example, the key platform 109 may maintain data on connectivity or speed of a vehicle, while the sensor module 107 maintains vehicle-specific data as received by sensors throughout the vehicle system. In such a scenario, the key platform 109 may still implement the physical eCall.

Lastly, the key platform 109 may function as a back-up system in the event that the vehicle system fails. For example, either the sensor module 107 or key platform 109 may determine conditions to place an eCall. The key platform 109 then places the call only after discovering that the vehicle system is disabled or unsuccessful in placing the call. For example, the system 100 may prompt a vehicle system or a mobile phone within a vehicle system network to place the eCall. For these cases, the sensor data may arrive from the sensor module 107, the mobile phones, the key, or even partial sensor data from other systems. Under such conditions, the key platform 109 may still implement the physical eCall should another UE 101 fail. In another embodiment, the key platform 109 may be in connection with a network service that requests, from the key platform 109, its current location and a vehicle status. As previously discussed, the network service may request such information to verify that loss of connectivity is attributable to an accident or emergency situation, rather than a usual function of the vehicle location.

By way of example, the UE 101, sensor module 107, key platform 109, and emergency platform 111 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. In one example embodiment, the UE 101, sensor module 107, key platform 109, and emergency platform 111, or any combination thereof, can be implemented in a same apparatus.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2A:
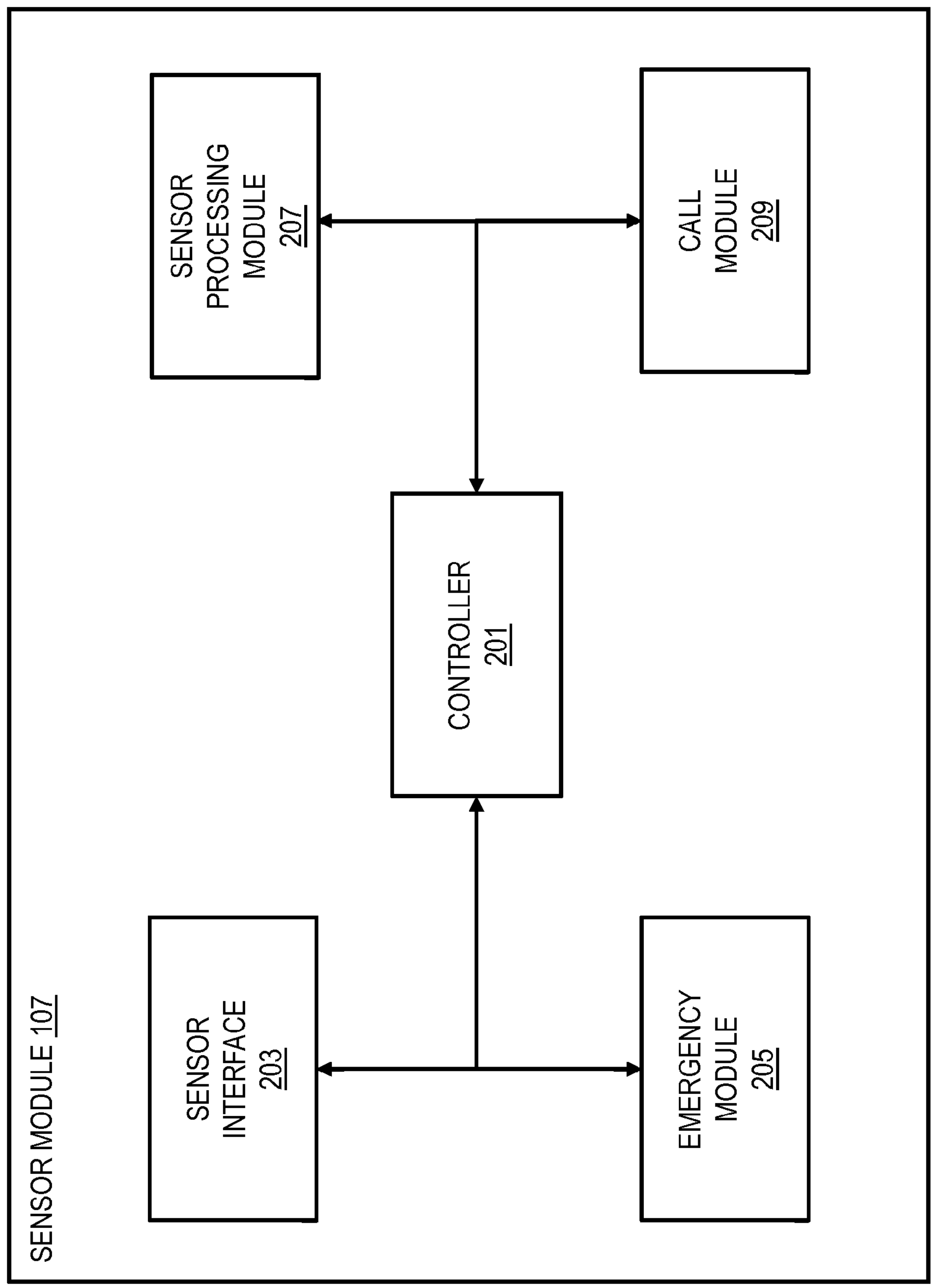
FIG. 2A is a diagram of the components of the sensor module, according to one embodiment.

FIG. 2A is a diagram 200 of the components of the sensor module 107, according to one embodiment. By way of example, the sensor module 107 may include one or more components for providing the indications of emergency conditions to prompt initiation of a call. It is contemplated that the functions of these components may be combined in one or more components or performed by other components of equivalent functionality. In this embodiment, the sensor module 107 includes a sensor interface 203, emergency module 205, sensor processing module 207, and call module 209. The controller 201 executes at least one algorithm for executing functions at the sensor module 107.

In one embodiment, the sensor interface 203 may receive data from sensors associated with the UE 101*a*. Vehicle sensor data may include speed, RPM, fuel level, cooling water level, engine temperatures, vehicle error codes, number of passengers, etc. For one instance, the sensors may be associated with certain emergency signals, including rapid acceleration, rapid deceleration, vehicle engine stop, vehicle airbag deployment, user physiological changes, or a combination thereof. In one embodiment, UE 101*a* may be a vehicle with sensors gathering data regarding its airbags. The controller 201 may cause the sensor interface 203 to monitor several sensors tracking one multiple aspects of the UEs 101. In one embodiment, the emergency module 205 may define parameters associated with call initiation, where the sensors gather data regarding the parameters. For instance, emergency module 205 may define lack of key connectivity as cause to initiating a call. The emergency module 205 may also set normal ranges of activity, for example, ranges regarding speed of the vehicle, temperatures of various components, etc. In another instance, the emergency module 205 may account for vehicle location. For example, via connection with a network service, the emergency module 205 may determine that loss of connectivity is expected at certain areas, including tunnels, mountains, wilderness, or rural areas. Then, the emergency module 205 may determine supplemental means to verify vehicle conditions or status to establish emergency occurrence since loss of connectivity may not serve as sufficient indication of an emergency.

The sensor processing module 207 may process data from the sensor interface 203 and ranges from the emergency module 205 such that the sensor processing module 207 may detect cause for call initiation when sensor data from the sensor interface 203 is out of range from parameters set by the emergency module 205. In addition, the sensor processing module 207 may detect when input from the sensor interface 203 may indicate that the parameters set by the emergency module 205 require modification. For example, the sensor processing module 207 may detect that sensor data regarding acceleration from the sensor interface 203 routinely reflects rapid, sudden acceleration. Under typical conditions, the acceleration may border on parameters set in the emergency module 205. However, the particular driver or vehicle may be prone to quicker acceleration as a habit. As such, the sensor processing module 207 may detect the practice and adjust parameters in the emergency module 205 accordingly so that calls are not initiated gratuitously. Sensor parameters associated with emergencies are only an exemplary trigger for call initiation. The sensor module 107 may be configured to respond to any range of sensory information or circumstance that may warrant initiating a call.

Upon detecting an aberration in the sensor data from ranges given by the emergency module 205, the sensor processing module 207 may trigger the controller 201 to work with the call module 209 to send a signal to call managers 103 and/or key platform 109 to initiate at least one call from a UE 101 or key. In another embodiment, the sensor processing module 207 may include determining location information of a UE 101 and transmitting it to one or more other UEs 101 and/or the key platform 109. In one embodiment, the sensor processing module 207 may continuously transfer location information to the key platform 109. In another embodiment, the sensor processing module 207 may transmit location information to the key platform 109 when a key is within communication range of at least one of the UEs 101.

In one embodiment, the controller 201 and call module 209 may initiate the emergency call, either at the call managers 103 or the key platform 109. For instance, the call module 209 may receive a request from the controller 201 to initiate at least one call. For instance, call module 209 may determine stored or current sensor data associated with the UEs 101*a*-101*k* and transmit the data during the emergency call. As previously discussed, such data may include data related to vehicle information, user health information, location information, or a combination thereof. In one scenario, the data transmitted may include a minimum set of data associated with at least one device or one or more other devices associated with the at least one device.

Figure 2B:
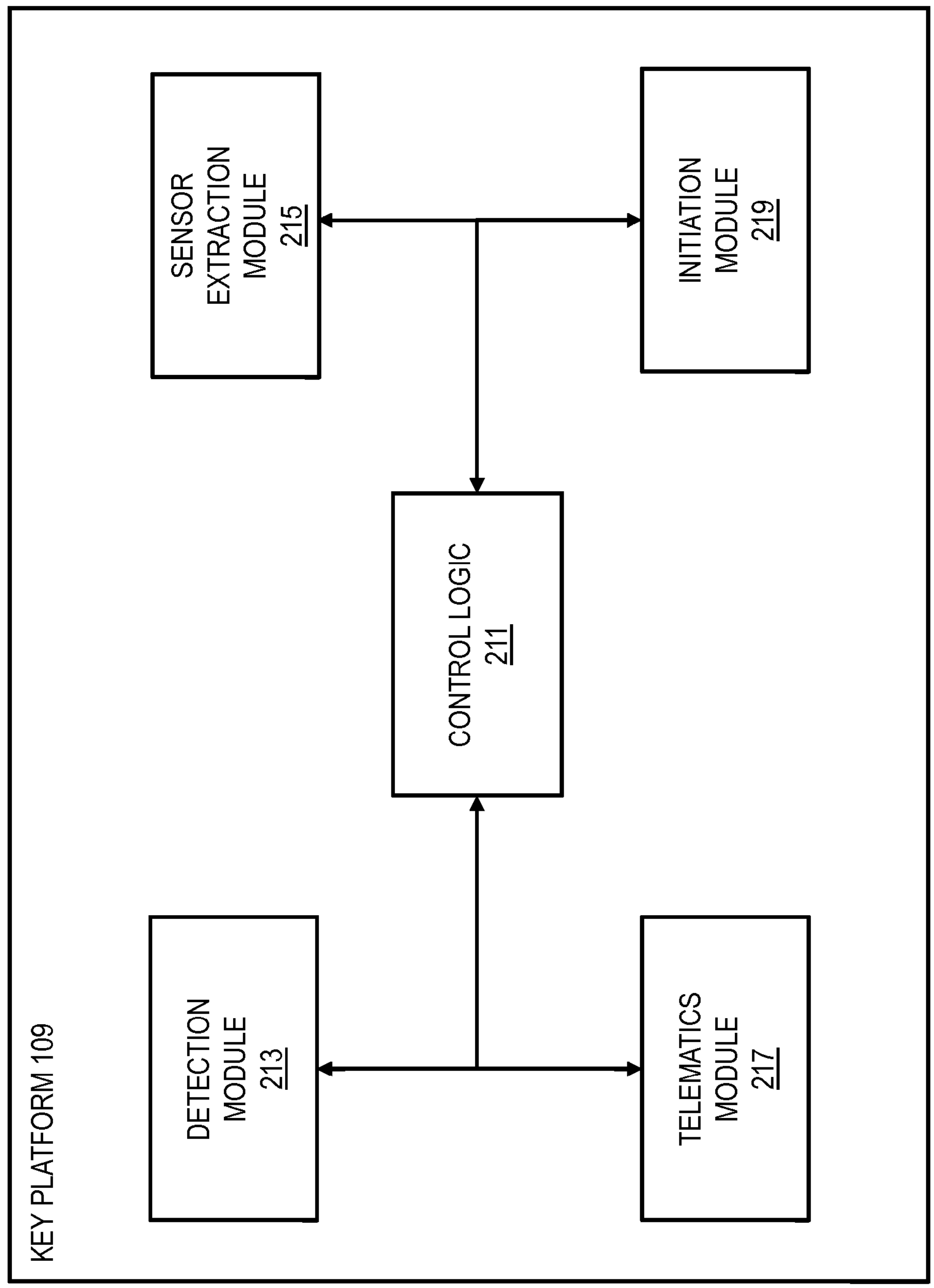
FIG. 2B is a diagram of the components of the key platform, according to one embodiment.

FIG. 2B is a diagram 220 of the components of the key platform 109, according to one embodiment. By way of example, key platform 109 may include one or more components for providing capability to initiate emergency calls via a key. It is contemplated that the functions of these components may be combined in one or more components or performed by other components of equivalent functionality. In this embodiment, the key platform 109 includes a control logic 211, detection module 213, sensor extraction module 215, telematics module 217, and initiation module 219.

In one embodiment, the control logic 211 and detection module 213 may determine a connection with a vehicle system. For instance, the connection may include a network within the vehicle formed by the vehicle system and/or the vehicle system in connection with mobile devices within the vehicle. In another embodiment, the control logic 211 and detection module 213 may determine proximity between a key and a vehicle system. For example, the control logic 211 and detection module 213 may recognize connectivity where the key and vehicle are within a given distance radius of one another, when a key is directly engaged with a vehicle, and/or when a key disengages from a vehicle. Alternately, the control logic 211 and detection module 213 may also function such that connectivity simply involves a key being associated with a vehicle system, independent of proximity cues. For example, the control logic 211 and detection module 213 may cause connectivity between a key and vehicle system in that the key receives information from the sensor module 107 regarding the vehicle system, despite whether or not it is entirely remote from the vehicle system. In another embodiment, the control logic 211 and detection module 213 may involve associating a user and/or user information with a key. For example, the key may contain user identity, family members (that may relate to the typical passengers in the user's vehicle), medical history, and/or allergies. The control logic 211 and detection module 213 may further require a personal identification code and/or password set by the user or vehicle manufacturer for the user to activate key usage.

In another embodiment, the control logic 211 and sensor extraction module 215 communicate with the sensor module 107 to extract data. For example, the control logic 211 may constantly receive transmissions regarding vehicle system data. For instance, the control logic 211 and sensor extraction module 215 may constantly determine the location of the vehicle. In one case, the control logic 211 and sensor extraction module 215 may continually update a cloud service in real time.

In another embodiment, the control logic 211 and telematics module 217 may determine location information of a vehicle and/or key independently or in conjunction with the sensor module 107. In one scenario, a vehicle system may include GPS sensors and sensors detecting presence of mobile devices with radio transmitters so that location may be determined whether the key is within or outside of the vehicle. For example, the control logic 211 and telematics module 217 may determine location information using cellular information means and/or sensor data from the sensor module 107. In another embodiment, the control logic 211 and telematics module 217 may store sensor data and/or update a cloud service so that information preceding the accident can be accessed by emergency teams for analysis.

In one embodiment, the control logic 211 and initiation module 219 may directly initiate a call from the key or prompt a user interface or display. For instance, control logic 211 and initiation module 219 may directly place a call to the emergency platform 111 and/or transmit saved data from the sensor extraction module 215 and telematics module 217. Alternately, the initiation module 219 may activate a button similar to a "panic button" that prompts user action or verification before directly placing the call. For such a case, the control logic 211 and initiation module 219 may also provide a user interface with more options, such as different picture icons representing types of emergencies where the user may easily click on an icon to give the emergency response team an idea of the nature of the accident. In another embodiment, the user interface may include dialogue options with simple questions or selection options, such as "number of vehicles in collision" or "number of passengers in vehicle." As with the call module 209, the initiation module 219 may transmit data including vehicle information, user health information, location information, or a combination thereof.

Figure 3:
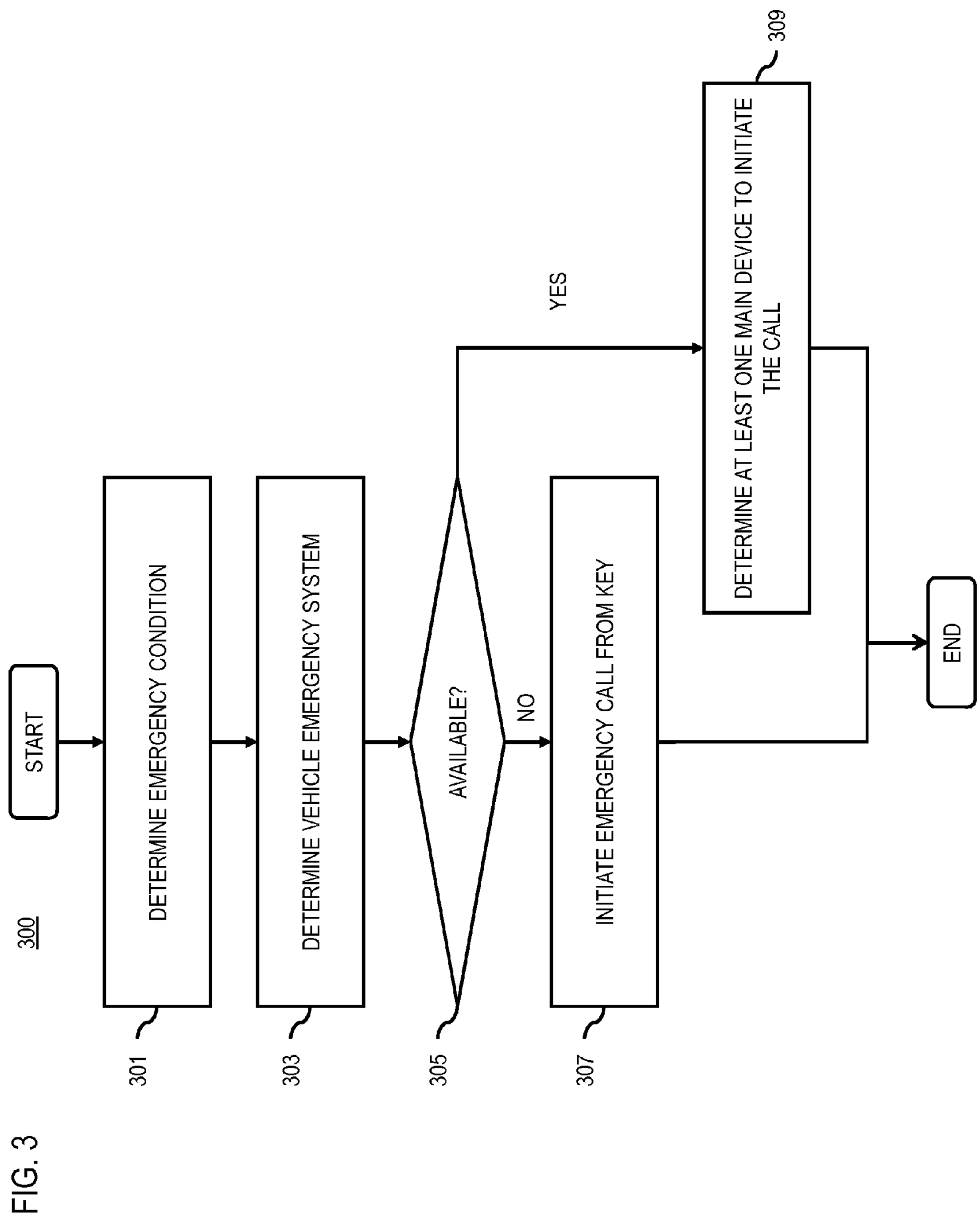
FIG. 3 is a flowchart of a process for placing an emergency call using a key, according to one embodiment.
Figure 12:
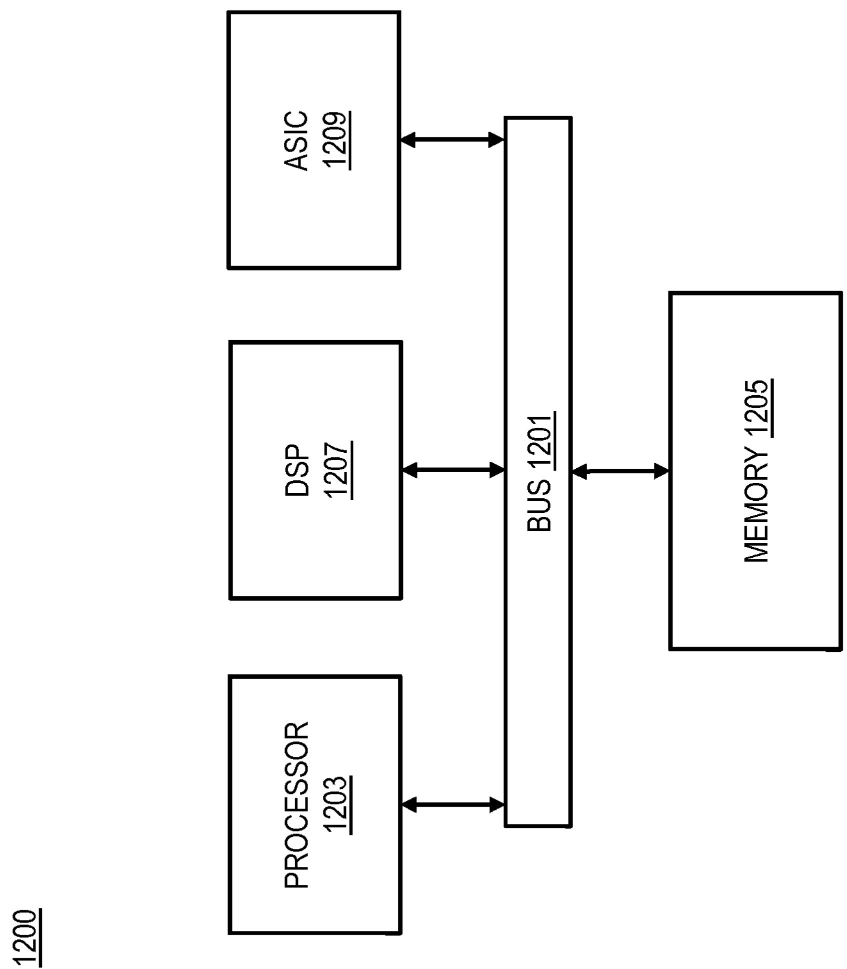
FIG. 12 is a diagram of a chip set that can be used to implement an embodiment of the invention.

FIG. 3 is a flowchart of a process for placing an emergency call using a key, according to one embodiment. In one embodiment, the controller 201 performs the process 300 and is implemented in, for instance, a chip set including a processor and a memory as shown in FIG. 12. In step 301, the controller 201 may process and/or facilitate a processing of sensor information to determine at least one emergency condition and cause, at least in part, an initiation of at least emergency call via at least one key in response to the at least one emergency condition, wherein the at least one key is configured with one or more emergency phone functionalities. In one embodiment, the controller 201 may determine a decision to initiate the at least one emergency call from at least one vehicle, that at least one key, or a combination thereof (step 303). For step 305, the controller 201 may determine the decision to initiate the at least one emergency call at the at least one key if an emergency system associated with the at least one vehicle is unavailable.

In one embodiment, the process 300 may involve initiation wherein the initiation of the at least one emergency call is performed by the at least one key if one or more other emergency phone functionalities associated with at least one vehicle is unavailable (step 307 and step 309). For example, a vehicle system may be place the emergency call by default. However, the controller 201 may cause the key to place the emergency call instead of the vehicle system is determined to be non-functional. In one embodiment, the key may place the call, wherein the at least one key is configured with at least one speaker, at least one microphone, or a combination thereof to support the one or more emergency phone functionalities. For example, key may include the option for the user to provide voice or audio input regarding his condition in an emergency, giving emergency rescue teams more details as to the situation and giving the user assurance that an emergency team is aware of the accident.

Figure 4:
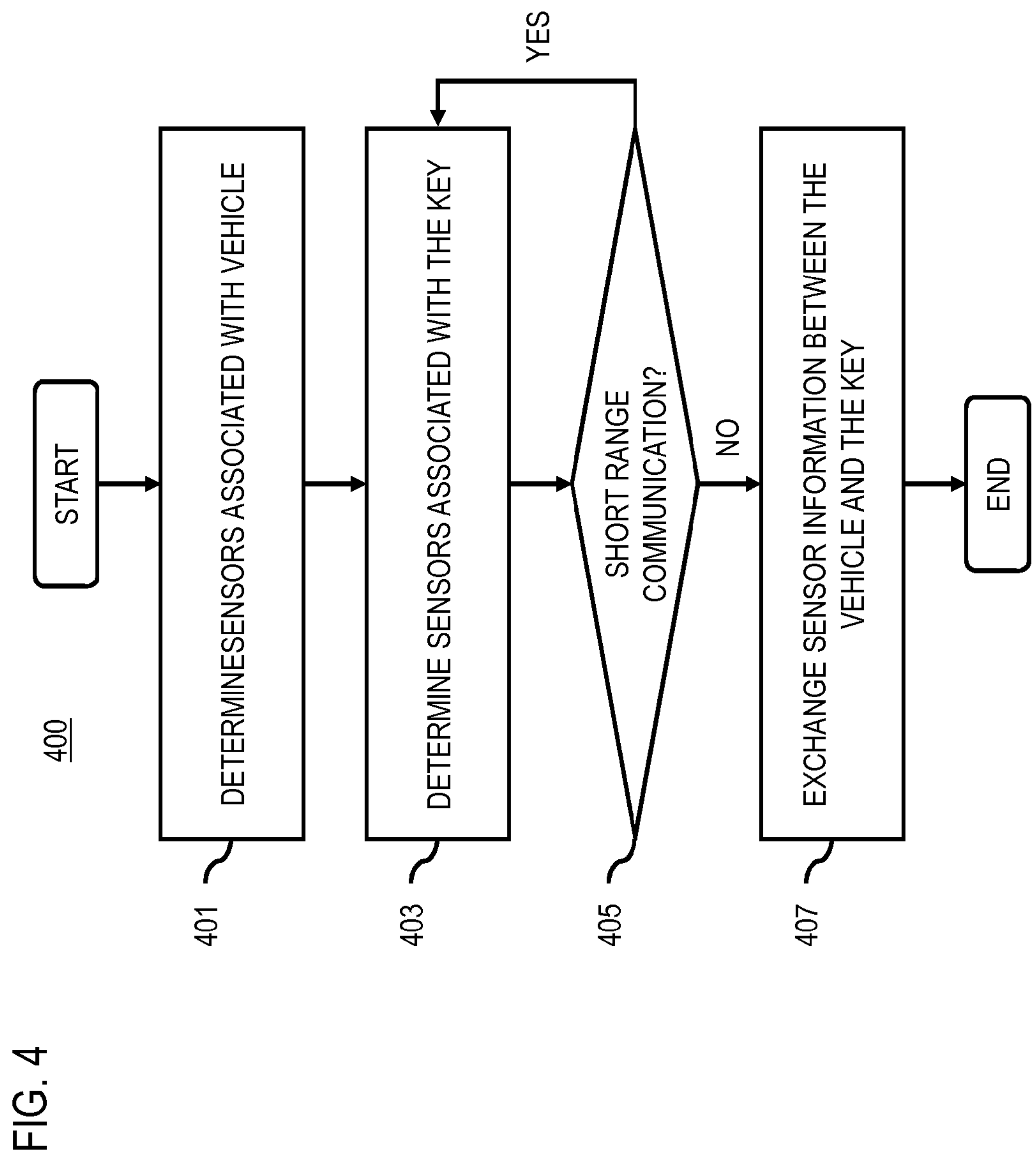
FIG. 4 is a flowchart of a process for exchanging information between vehicle sensors and a key, according to one embodiment.

FIG. 4 is a flowchart of a process for exchanging information between vehicle sensors and a key, according to one embodiment. In one embodiment, the controller 201 performs the process 400 and is implemented in, for instance, a chip set including a processor and a memory as shown in FIG. 12. In steps 401 and 403, the controller 201 may determine the sensor information from one or more sensors associated with at least one vehicle, one or more sensors associated with the at least one key, or a combination thereof. For example, the controller 201 may determine the information wherein the sensor information includes, at least in part, location information, the method further comprising determine the location information based, at least in part, on cellular information associated with the one or more emergency phone functionalities of the at least one key. Cellular information may include, for example, cell identification information including triangulation means to determine the location of the key without requiring that the key have sensor or Global Positioning System functionality embedded in it.

As another example, the sensor information may include, at least in part, location information, the method further comprising determining the location information from the one or more sensors of the at least one vehicle by causing, at least in part, a transmission of the location information from the one or more sensors to the at least one key if the at least one key is within a communication range of the at least one vehicle. Furthermore, for step 405, the controller 201 may determine the respective sensor information, wherein the one or more sensors associated with the at least one vehicle and the one or more sensors associated with the at least one key exchange the sensor information via one or more short range communication means. For example, the controller 201 may detect a key as being in near field communication (NFC) with a vehicle system. The controller 201 may then transmit sensor data from the vehicle system to the key via short range communication.

Figure 5:
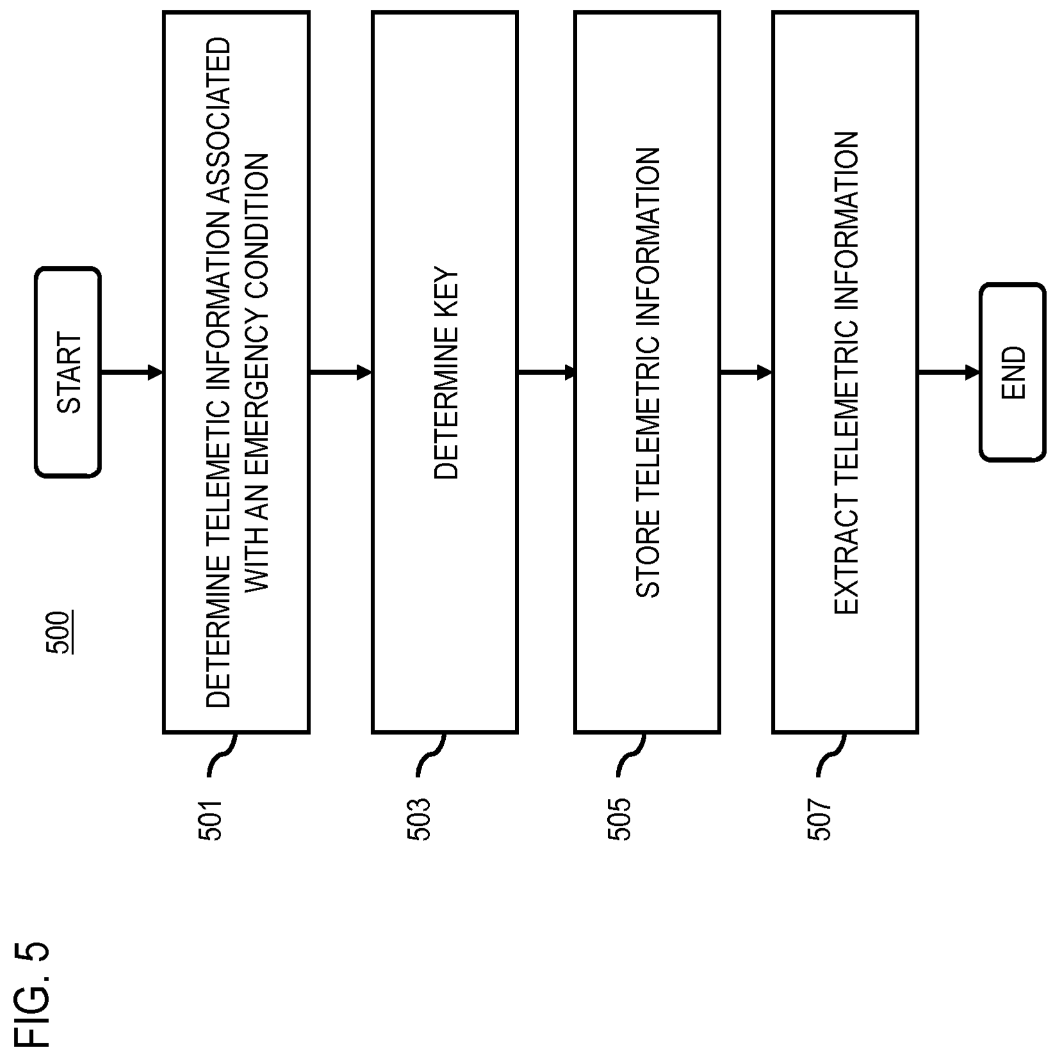
FIG. 5 is a flowchart of a process for determining and storing sensor data using a key, according to one embodiment.

FIG. 5 is a flowchart of a process for determining and storing sensor data using a key, according to one embodiment. In one embodiment, the control logic 211 performs the process 500 and is implemented in, for instance, a chip set including a processor and a memory as shown in FIG. 12. In step 501, the control logic 211 may determine data including telematics information associated with the at least one emergency condition. Then, the control logic 211 may determine the presence of the key and cause, at least in part, a storage of the telematics information at the at least one key (steps 503 and 505). As a further step, step 507 may include the control logic 211 transmitting or extracting the saved telemetric information for accident analysis.

Figure 6A:
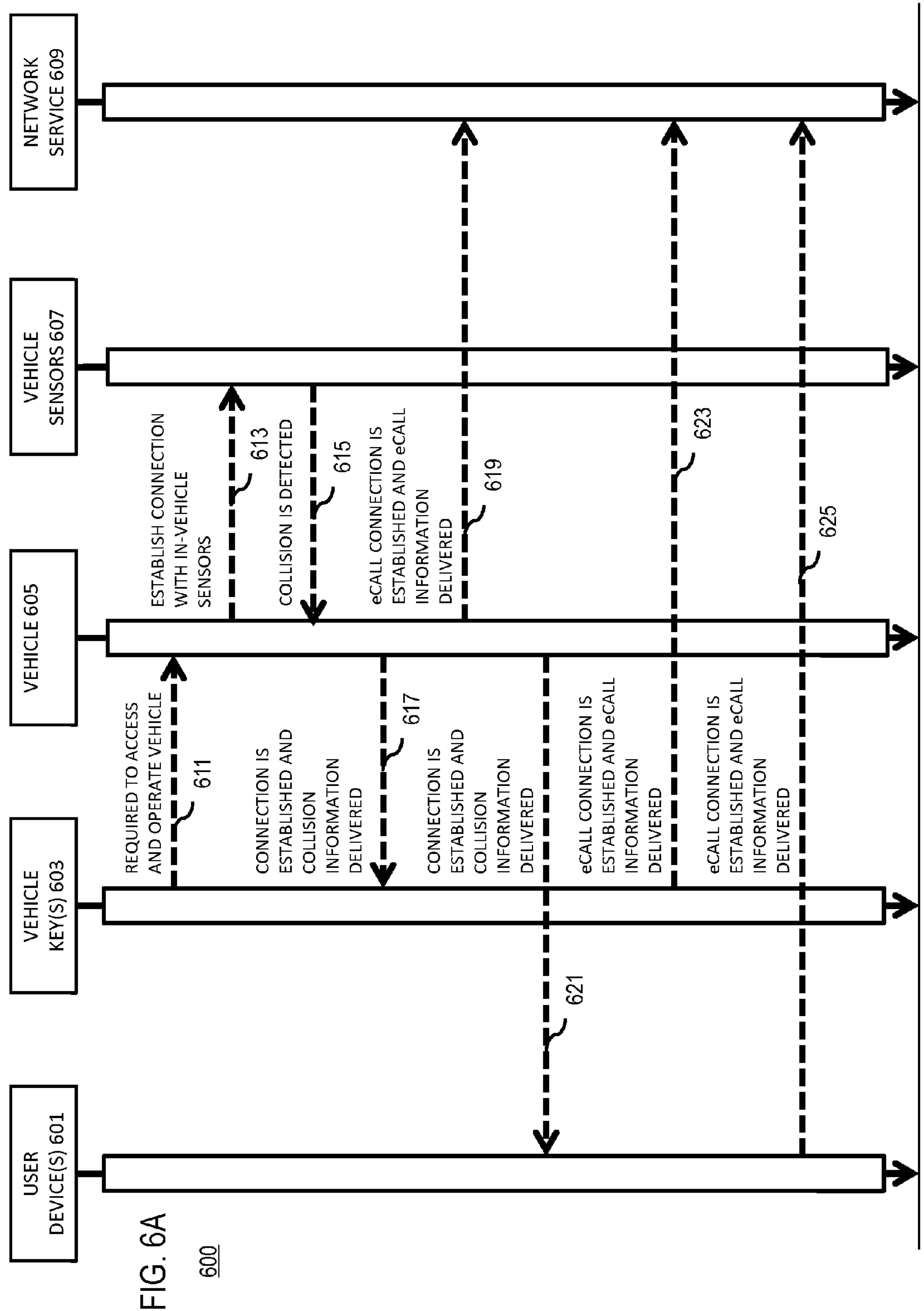
FIGS. 6A-10B are diagrams of user interfaces utilized in the processes of FIG. 3, according to various embodiments.
Figure 6B:
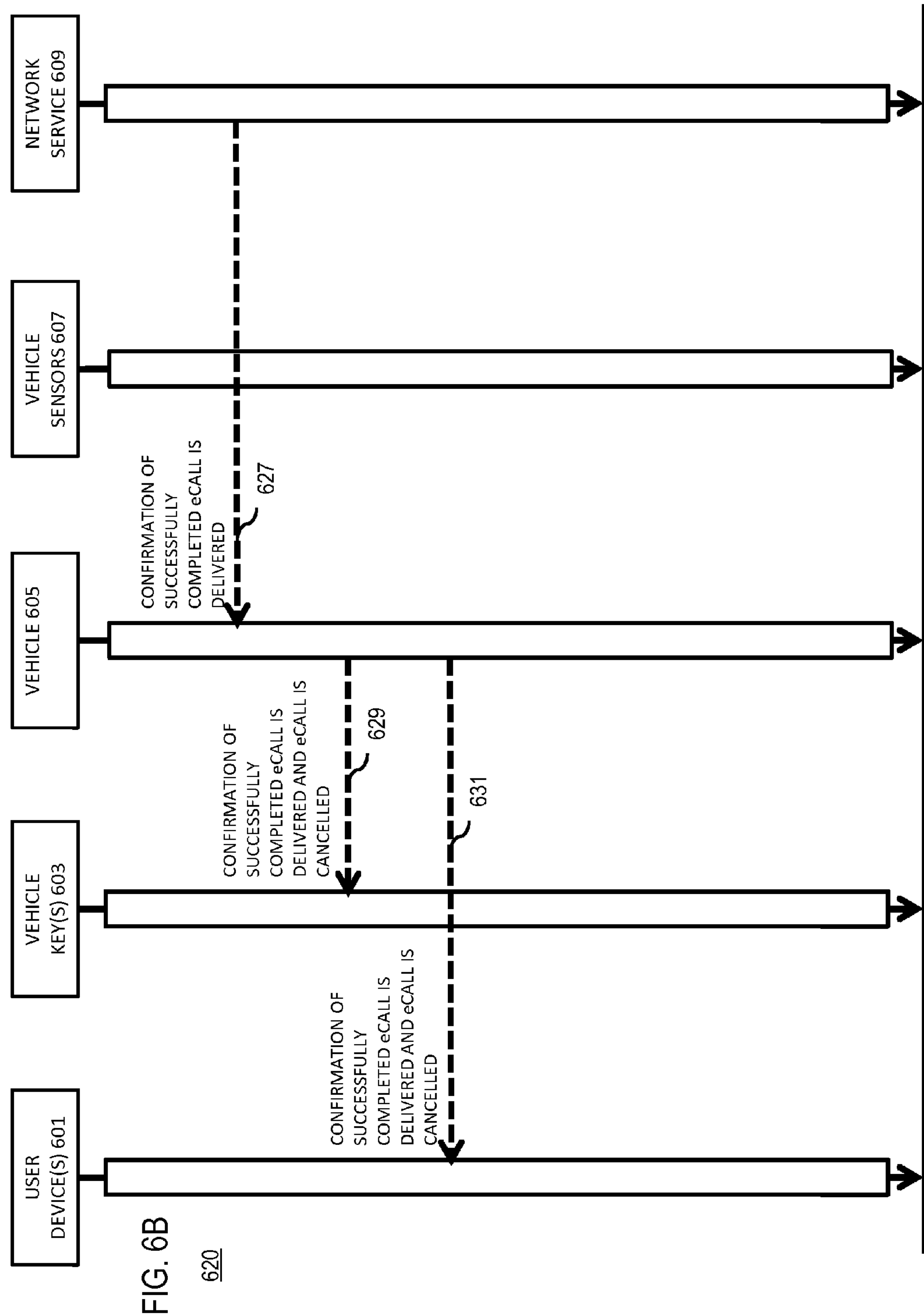

FIGS. 6A-6B are diagrams of signal processes detailing the processes of FIG. 3, according to one embodiment. For example, processes 600 and 620 of FIGS. 6A and 6B may illustrate the maximum security in the case of failure, using three or more eCall enabled systems. In one embodiment, the transmissions may involve user device(s) 601, vehicle key(s) 603, a vehicle 605, vehicle sensors 607, and a network service 609. In one embodiment, the vehicle keys 603 may first establish connectivity 611 to vehicle 605 to access and operate the vehicle. For instance, a user may establish connectivity 611 in putting the key in a vehicle ignition. Then, vehicle 605 and vehicle sensors 607 communicate via signal 613 to establish connection with in-vehicle sensors. The vehicle sensors 607 may detect a collision, whereupon signal 615 is sent from vehicle sensors 607 to vehicle 605. Vehicle 605 then transmits collision information 617 to the vehicle keys 603 and/or establishes an eCall connection 619 with the network service 609 to deliver the call and collision information. The vehicle 605 may further establish connectivity 621 with user devices 601 should user devices 601 also be available for eCalling. Then either the vehicle keys 603 may establish a connection 623 with the network service 609 or the user devices 601 may establish contact 625 with the network service 609. As such, with the embodiment of process 600, the vehicle 605, vehicle keys 603, and/or user devices 601 may all establish eCall connections and deliver eCall information to the network service 609.

To follow, process 620 of FIG. 6B shows that the network service 609 may send confirmation to one of the three eCall enabled systems, and cancel connections from the remaining two. For instance, the network service 609 may send confirmation 627 to vehicle 605 of successfully completed eCall where the vehicle system successfully connects to the eCall center. The network service 609 may then cancel eCalls from vehicle keys 603 and user devices 601 using signals 629 and 631, respectively.

Figure 7A:
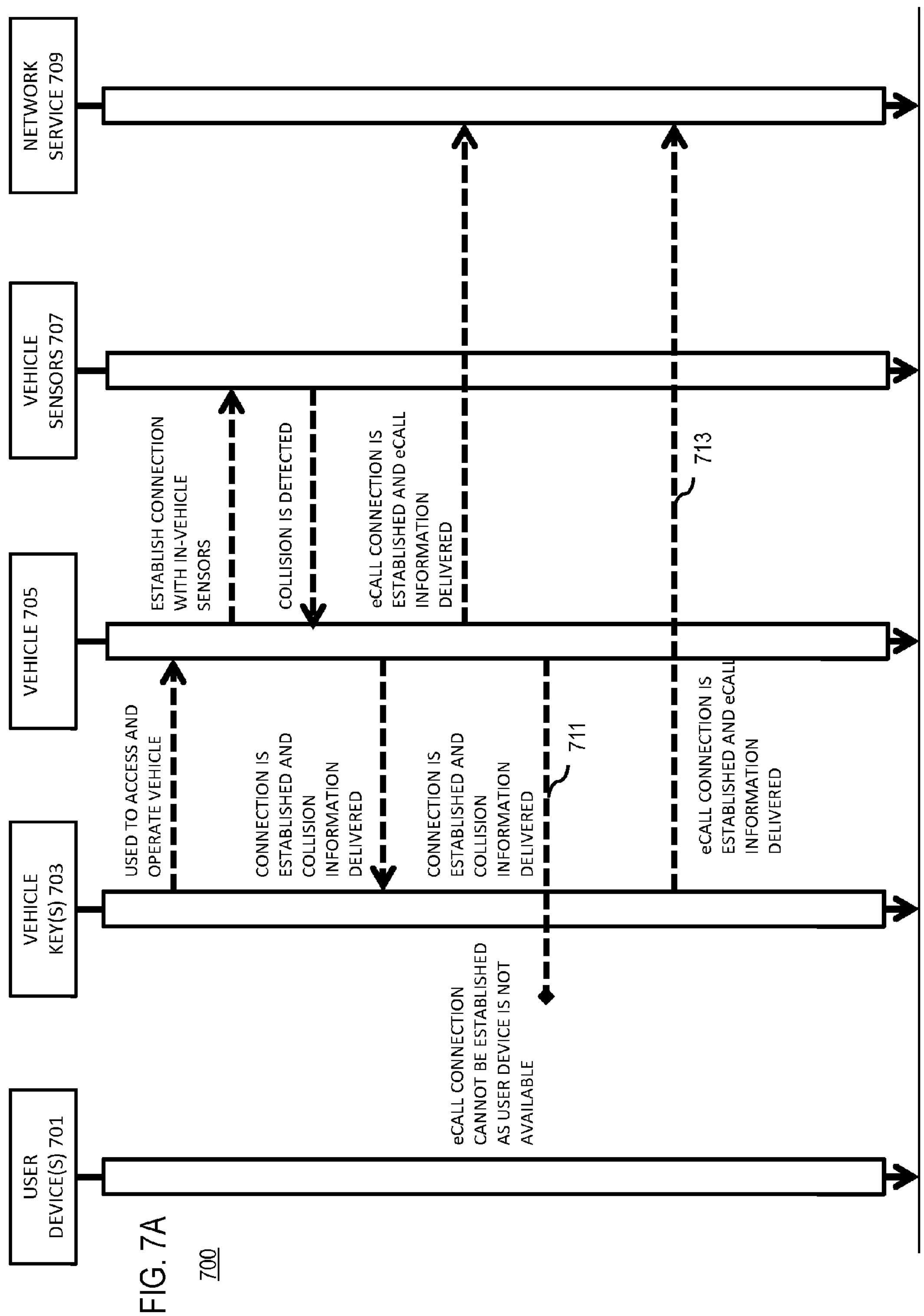
Figure 7B:
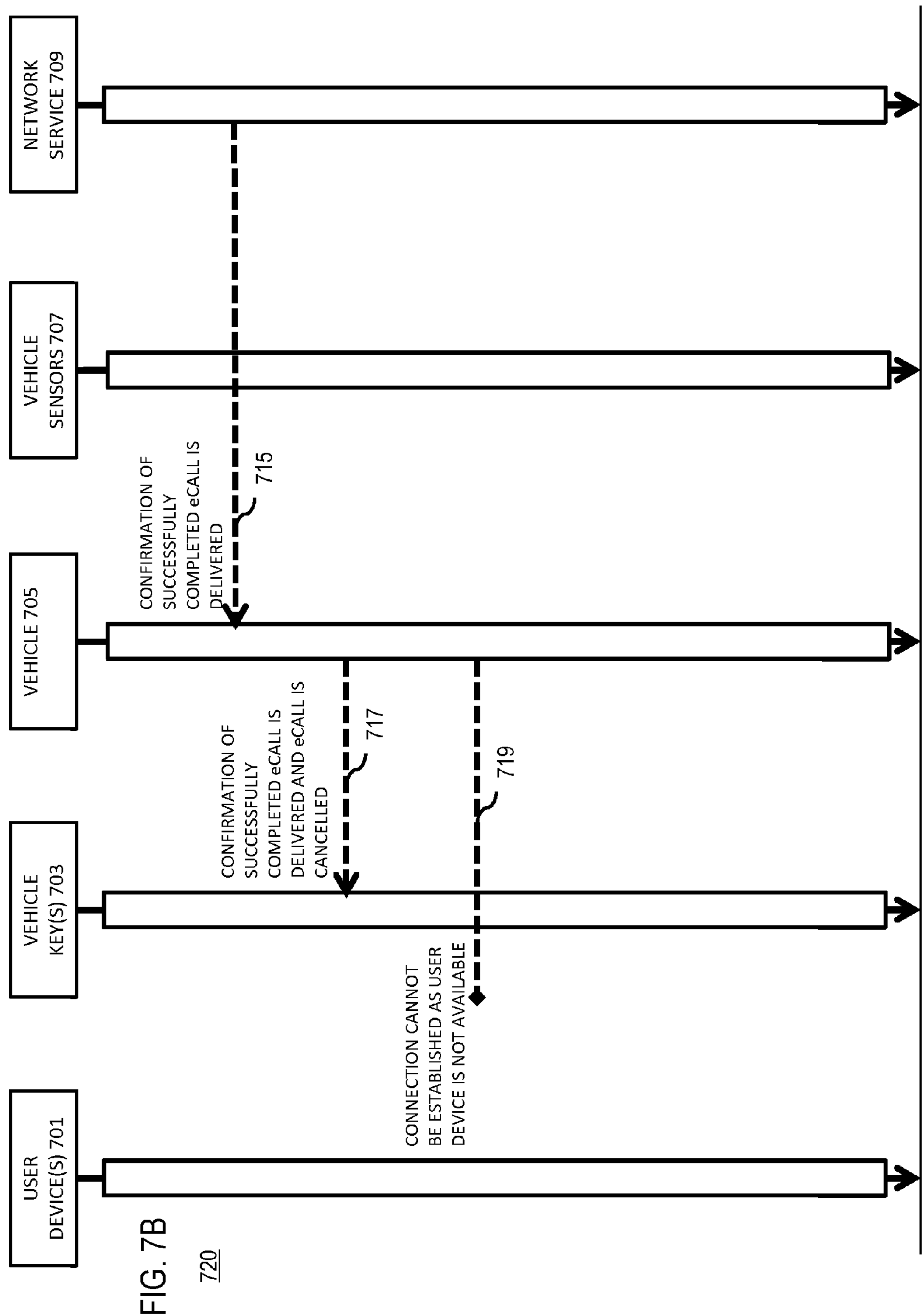

FIGS. 7A-7B are diagrams of signal processes detailing the processes of FIG. 3, according to one embodiment. For example, processes 700 and 720 of FIG. 7A and FIG. 7B may illustrate the scenario of a key acting as a back-up eCall system for the vehicle system. In one embodiment, the transmissions may involve user device(s) 701, vehicle key(s) 703, a vehicle 705, vehicle sensors 707, and a network service 709. For example, the vehicle 705 may detect a collision and prompt user devices 701 to establish eCall connections and deliver information using signal 711. However, signal 711 may not successfully reach user devices 701 because the user devices 701 are not available. Vehicle keys 703 may recognize the failure of signal 711 to establish an eCall connection, thus initiating connection 713 with the network service 709 itself. Then, as shown with process 720 of FIG. 7B, the network service 709 may send confirmation 715 to vehicle 705 of the successfully completed eCall where the vehicle system successful connects to the eCall center. The network service 709 may then cancel eCalls for vehicle keys 703 and user devices 701 using signals 717 and 719, respectively, although signal 719 cannot reach the unavailable user devices 701.

Figure 8A:
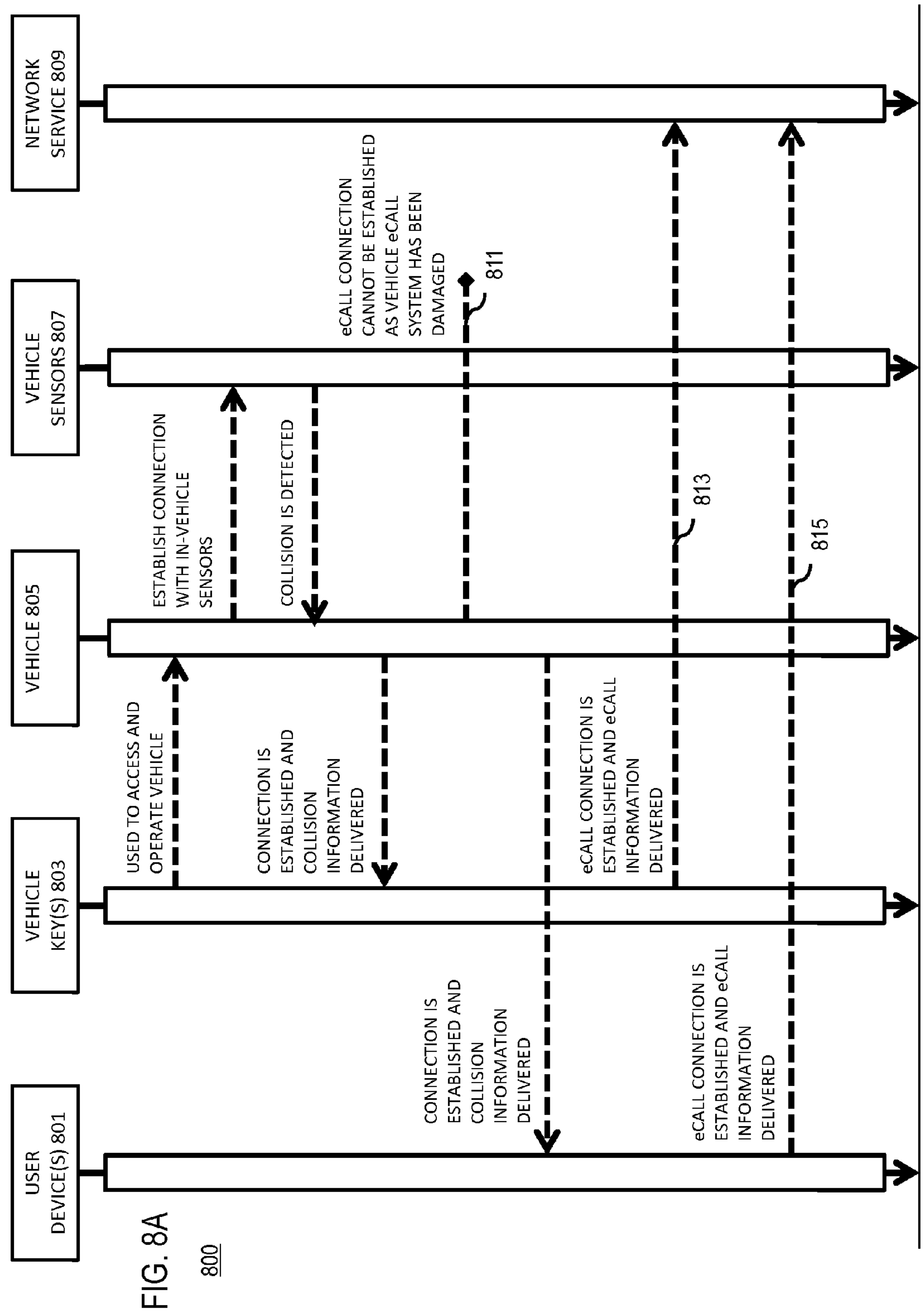
Figure 8B:
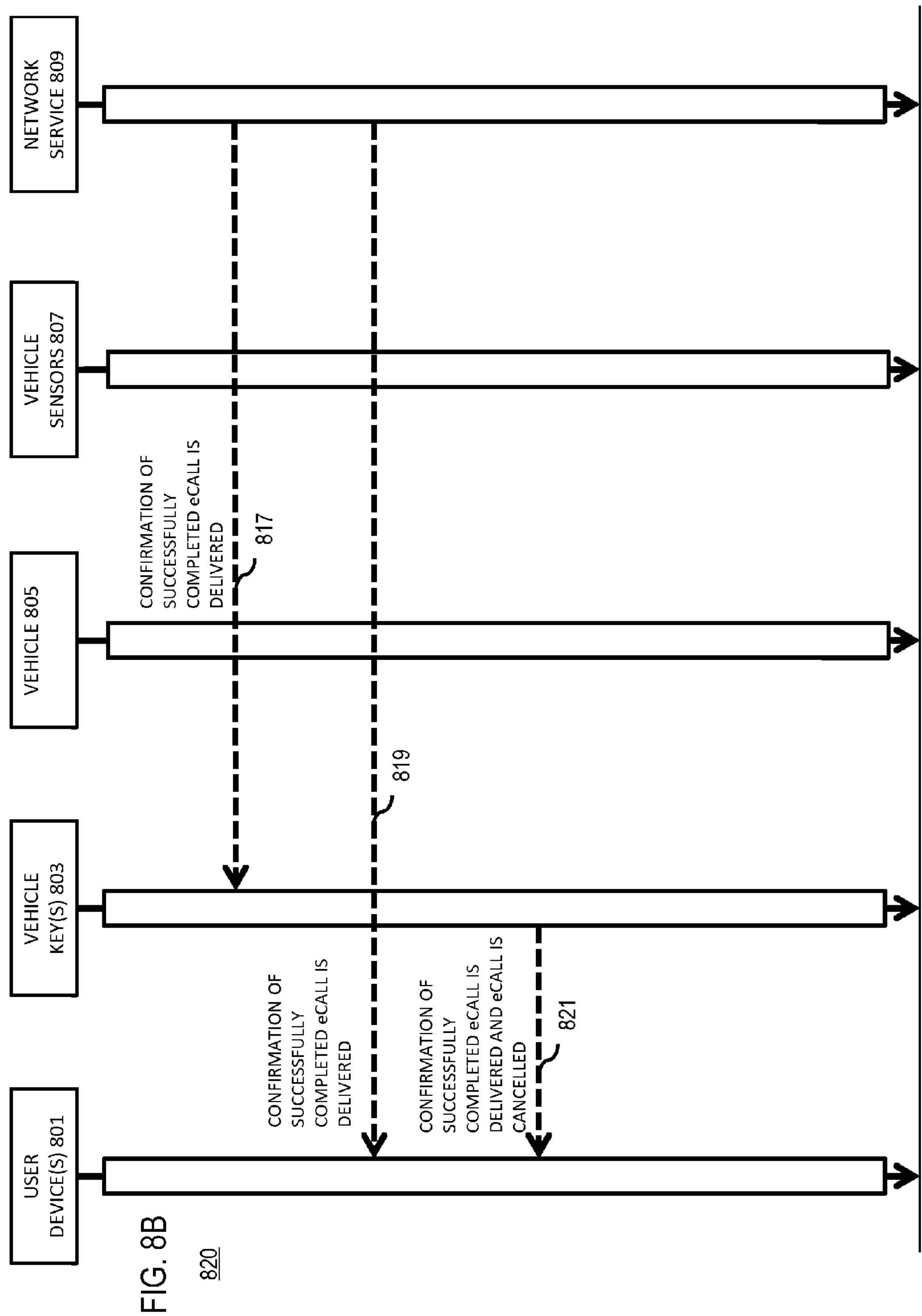

FIGS. 8A-8B are diagrams of signal processes detailing the processes of FIG. 3, according to one embodiment. For example, processes 800 and 820 of FIGS. 8A and 8B may illustrate the scenario where the key and/or user devices provide back-up for a failure of the vehicle to place an eCall. In one embodiment, the transmissions may involve user device(s) 801, vehicle key(s) 803, a vehicle 805, vehicle sensors 807, and a network service 809. Here, the vehicle sensors 807's transmission of signal 811 to establish an eCall connection with network service 809 is unsuccessful, perhaps because the vehicle 805 eCall system is damaged. Then, the vehicle 805 may connect with user devices 801 with the output of signal 813 to deliver connection and collision information. Then, vehicle keys 803 and/or user devices 801 may establish eCall connections and deliver eCalls to network service 809 via signals 813 and 915, respectively. As shown with process 820 of FIG. 8B, the network service 909 may then send confirmation signals 817 and 819 to vehicle keys 803 and user devices 801 of the successfully completed eCall. Upon detecting that confirmation signal 819 from network service 809 reached user devices 801, the vehicle keys 803 may send signal 821 to user devices 801 to cancel eCall attempts from user devices 801 since a connection is already established.

Figure 9A:
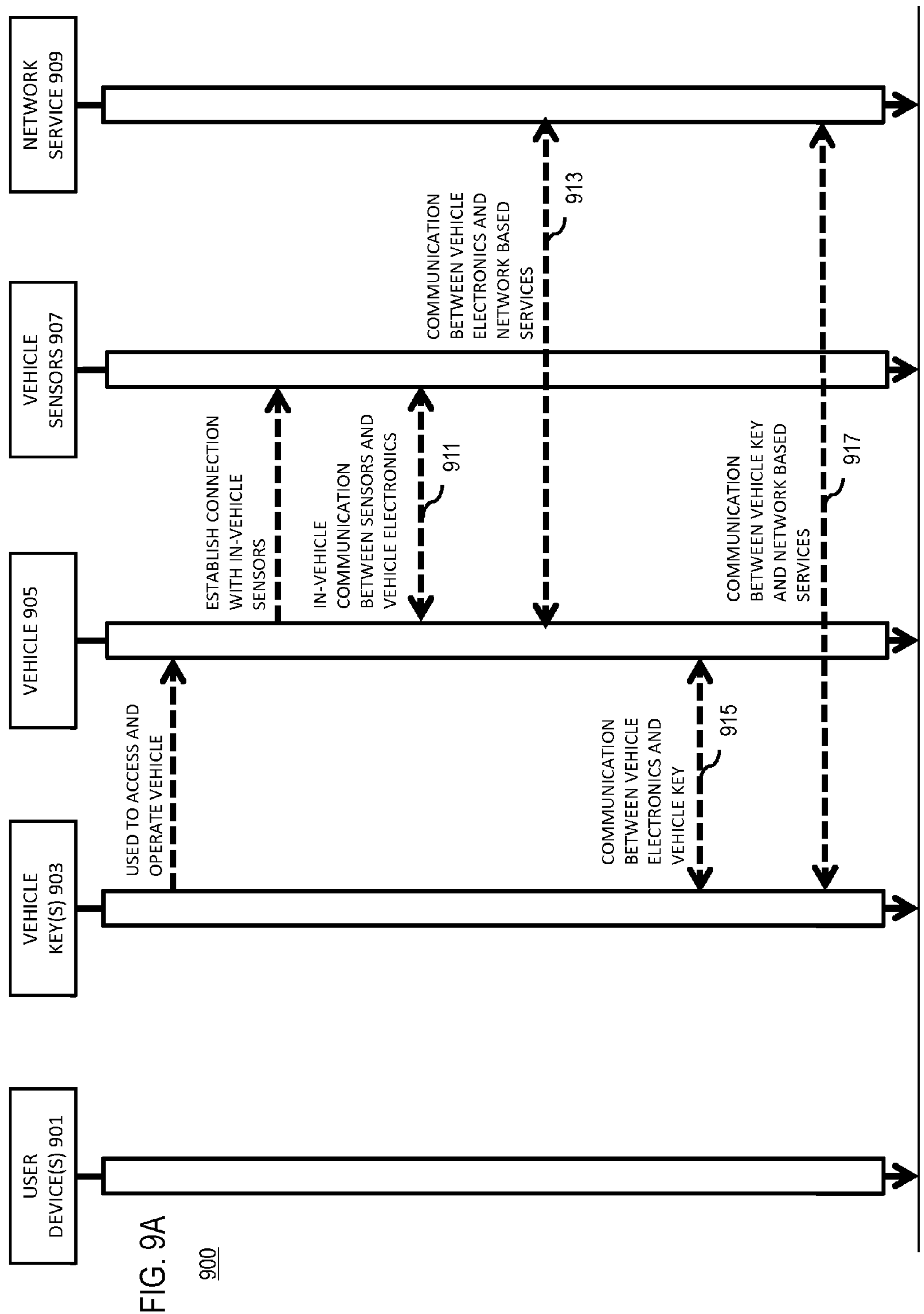

FIGS. 9A-9B are diagrams of signal processes detailing the processes of FIG. 3, according to one embodiment. For example, processes 900 and 920 of FIGS. 9A and 9B may illustrate the various communications between eCalling systems. In one embodiment, the transmissions may involve user device(s) 901, vehicle key(s) 903, a vehicle 905, vehicle sensors 907, and a network service 909. Here, the vehicle 905 and vehicle sensors 907 may interact via signals 911 to continually communicate regarding sensor data and vehicle electronics. Furthermore, vehicle 805 and network services 909 may communicate over signals 913 to establish communication between vehicle electronics and network-based services. For example, signals 913 may include interaction with a cloud service that tracks vehicle data. Then, vehicle 905 may transmit signals 915 to vehicle keys 903 to establish communication. Similarly, vehicle keys 903 may establish communication with network service 090 via signals 917. As such, the vehicle 907 and vehicle keys 903 are both in connection with the network service 909. Meanwhile, vehicle 907 and vehicle keys 903 communicate with signals 915, for instance, to continuously convey sensor data regarding vehicle 907. The vehicle keys 903 may then save such data.

Next with process 920 as shown in FIG. 9B, vehicle keys 903 may determine sudden loss of connectivity 919 between itself, vehicle keys 903, and vehicle 905. Then, the vehicle keys 903 may output signal 921 to network service 909 as a request to connect. In one embodiment, signal 921 may include a request for a timestamp of the last noted time before connectivity 919 was lost. Upon receiving signal 921, network service 909 may respond with signal 923 to vehicle keys 903, conveying information of the timestamp. Then, vehicle keys 903 may perform a processing 925 of the last known communication as provided by the network service 909. Processing 925 may include analyzing the timing of the last known communication, vehicle speed, location, time needed to stop the vehicle 905, etc. Then, vehicle keys 903 may contact network service 909 to establish an eCall connection 927 and deliver the processed information. In response, the network service 909 may transmit signal 929 to vehicle keys 903 to confirm successful eCall completion and information delivery.

Figure 10A:
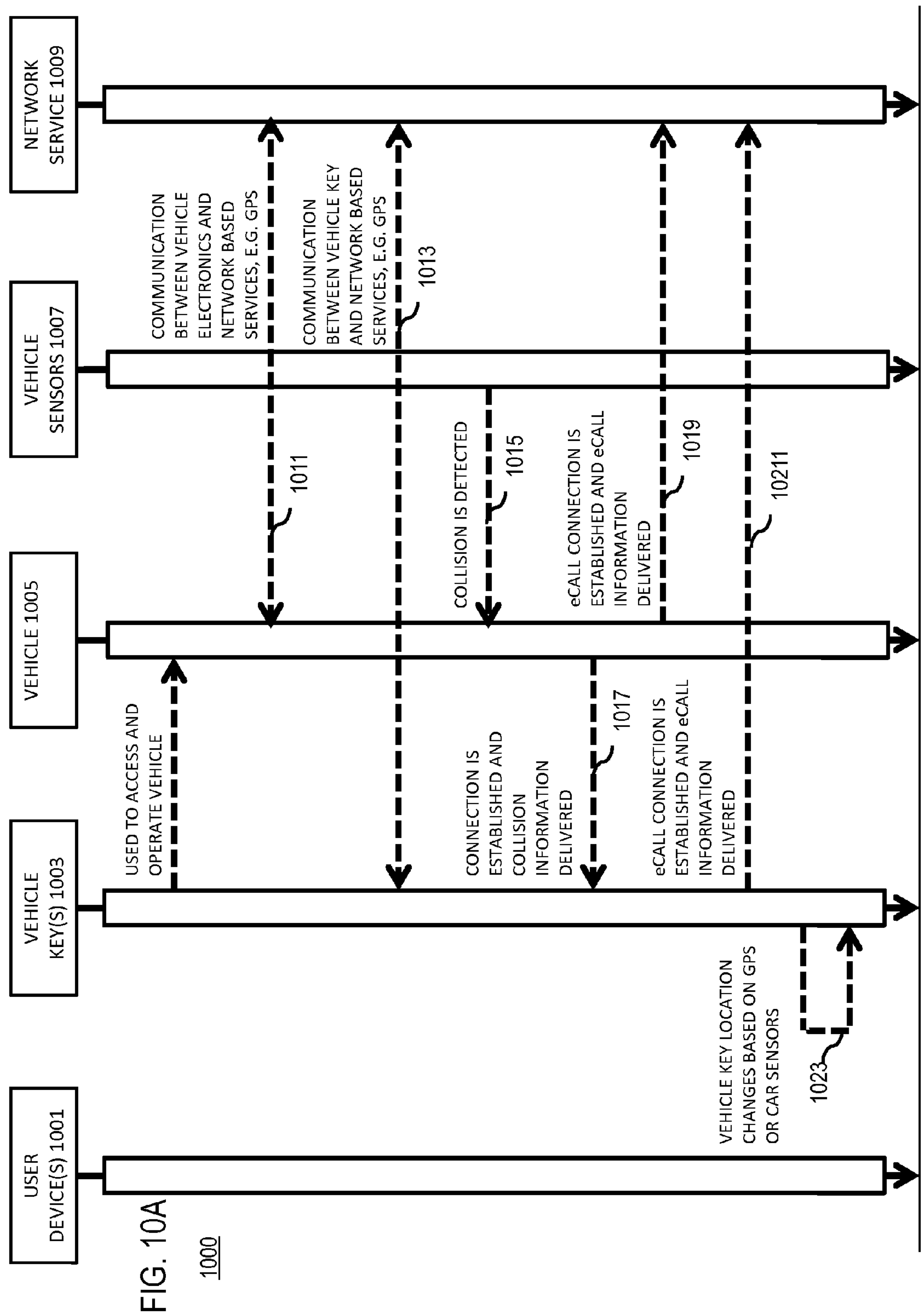
Figure 10B:
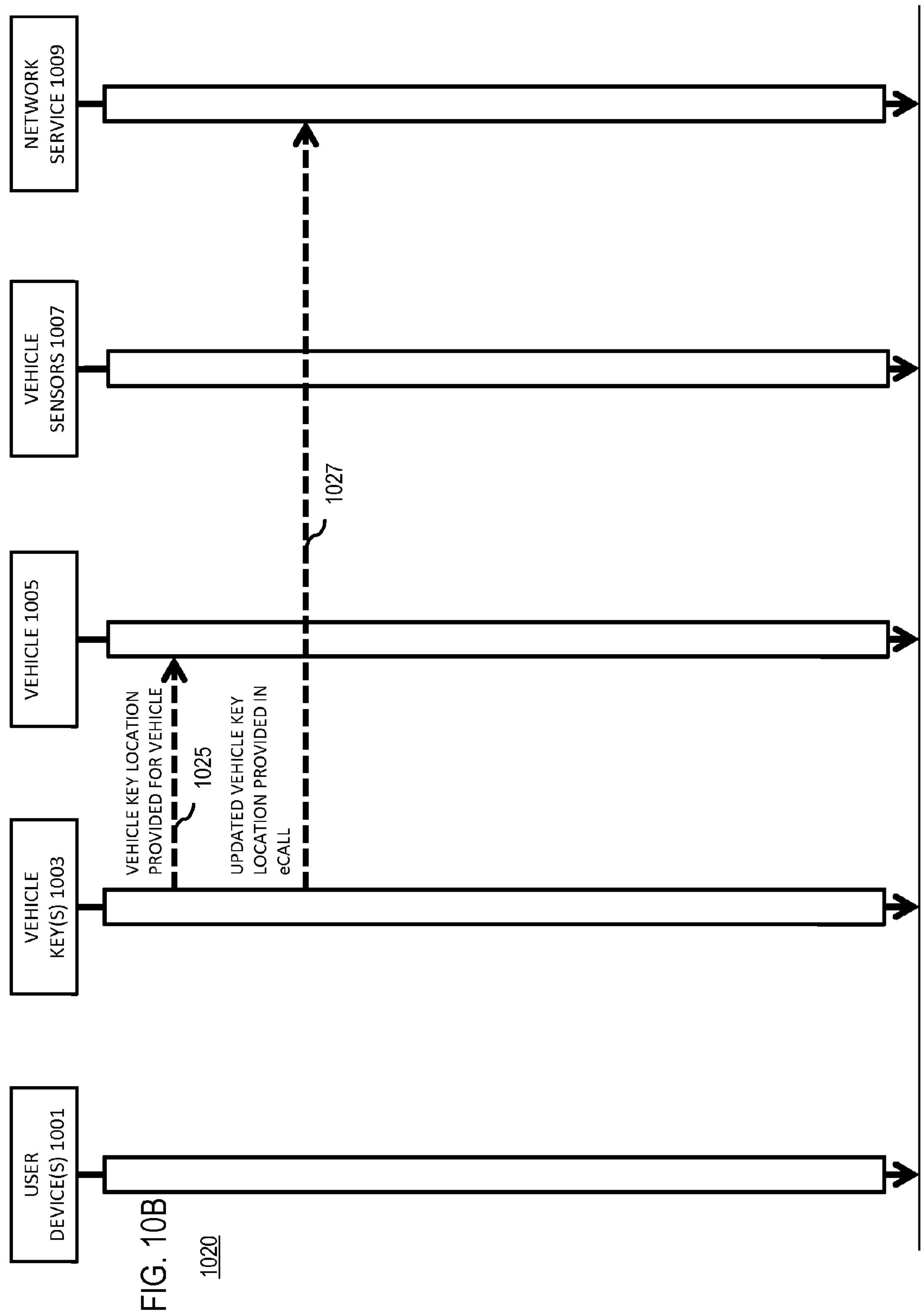

FIGS. 10A-10B are diagrams of signal processes detailing the processes of FIG. 3, according to one embodiment. For example, processes 1000 and 1020 of FIGS. 10A and 10B may illustrate the use of location information for the vehicle keys and vehicle. In one embodiment, the transmissions may involve user device(s) 1001, vehicle key(s) 1003, a vehicle 1005, vehicle sensors 1007, and a network service 1009. In one embodiment, the vehicle 1005 may contact network service 1009 with signal 1011 to allow communication between the vehicle electronics and network-based services, including GPS capability. The network service 1009 may then contact vehicle keys 1003 to communicate the network-based services to the vehicle keys using signals 1013. This way, the vehicle keys 1003 also have access to network service 1009 in connection with the vehicle 1003. In one embodiment, vehicle sensors 1007 and vehicle 1005 may detect a collision with exchange 1015. Then, vehicle 1005 may establish a connection 1017 with vehicle keys 1003 to deliver collision information.

Vehicle 1005 may also contact network service 1009 via signal 1019 to establish an eCall. In one embodiment, vehicle key 1003 may similarly initiate connection 1021 with network service 1009 to establish an eCall. In a further embodiment, vehicle key 1003 may perform a processing 1023 of vehicle key location based on sensors such as vehicle sensors 1007 and/or GPS information as provided by previous connection with network service 1009. Regarding process 1020 shown in FIG. 10B, the vehicle keys 1003 may contact vehicle 1005 to provide key location via signal 1025. For example, the key location may be an indication of vehicle location. Then, the vehicle keys 1003 may update vehicle key information in the network service 1009 via signal 1027 during the eCall.

The processes described herein for placing an emergency call using a key may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
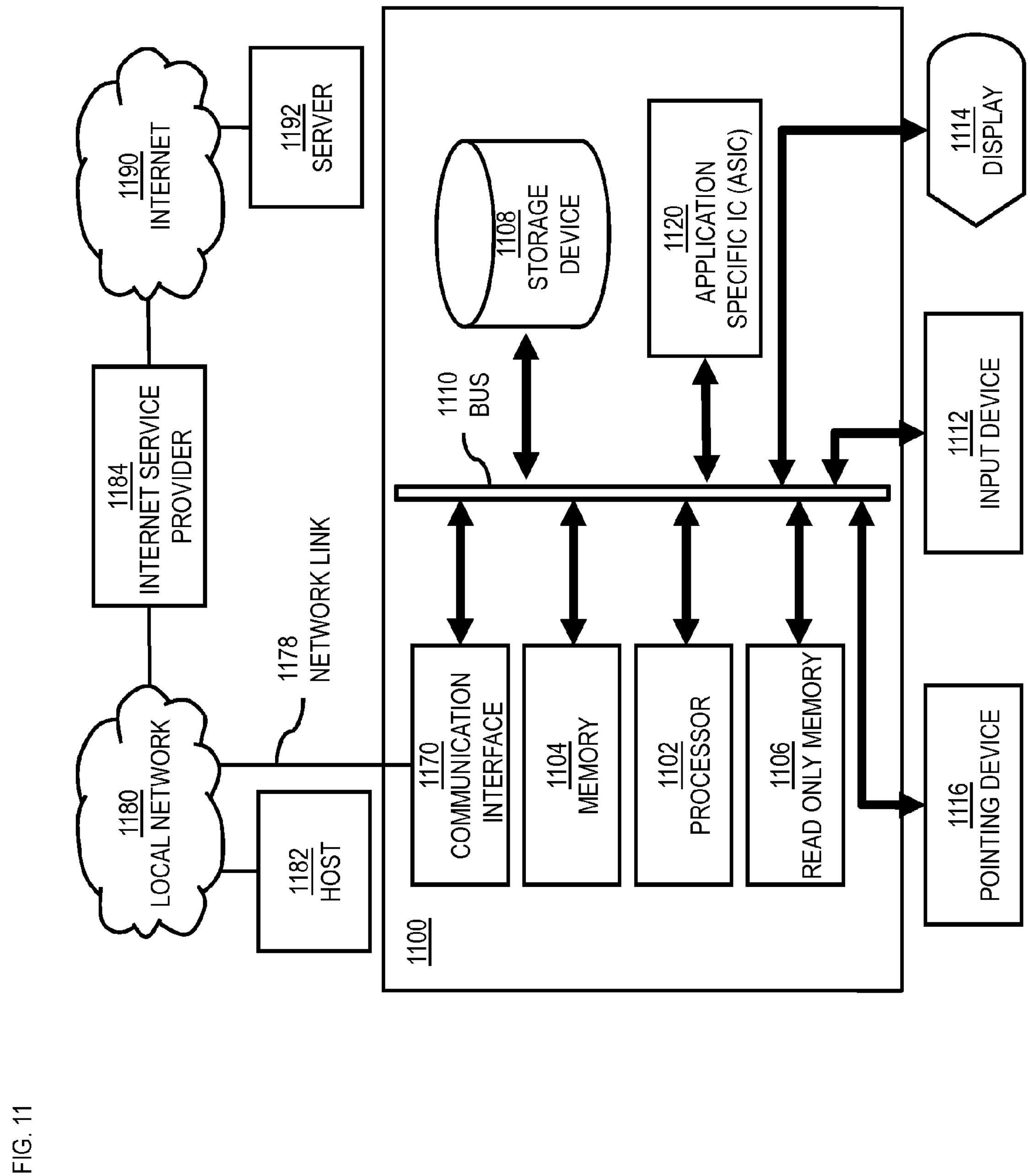
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to place an emergency call using a key as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of placing an emergency call using a key.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to placing an emergency call using a key. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1100 also includes a memory 1104 coupled to bus 1110. The memory 1104, such as a random access memory (RAM) or any other dynamic storage device, stores information including processor instructions for placing an emergency call using a key. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for placing an emergency call using a key, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114, and one or more camera sensors 1194 for capturing, recording and causing to store one or more still and/or moving images (e.g., videos, movies, etc.) which also may comprise audio recordings. In some embodiments, for example, in embodiments in which the computer system 1100 performs all functions automatically without human input, one or more of external input device 1112, display device 1114 and pointing device 1116 may be omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for placing an emergency call using a key to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to place an emergency call using a key as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of placing an emergency call using a key.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to place an emergency call using a key. The memory 1205 also stores the data associated with or generated by the execution of the inventive steps.

Figure 13:
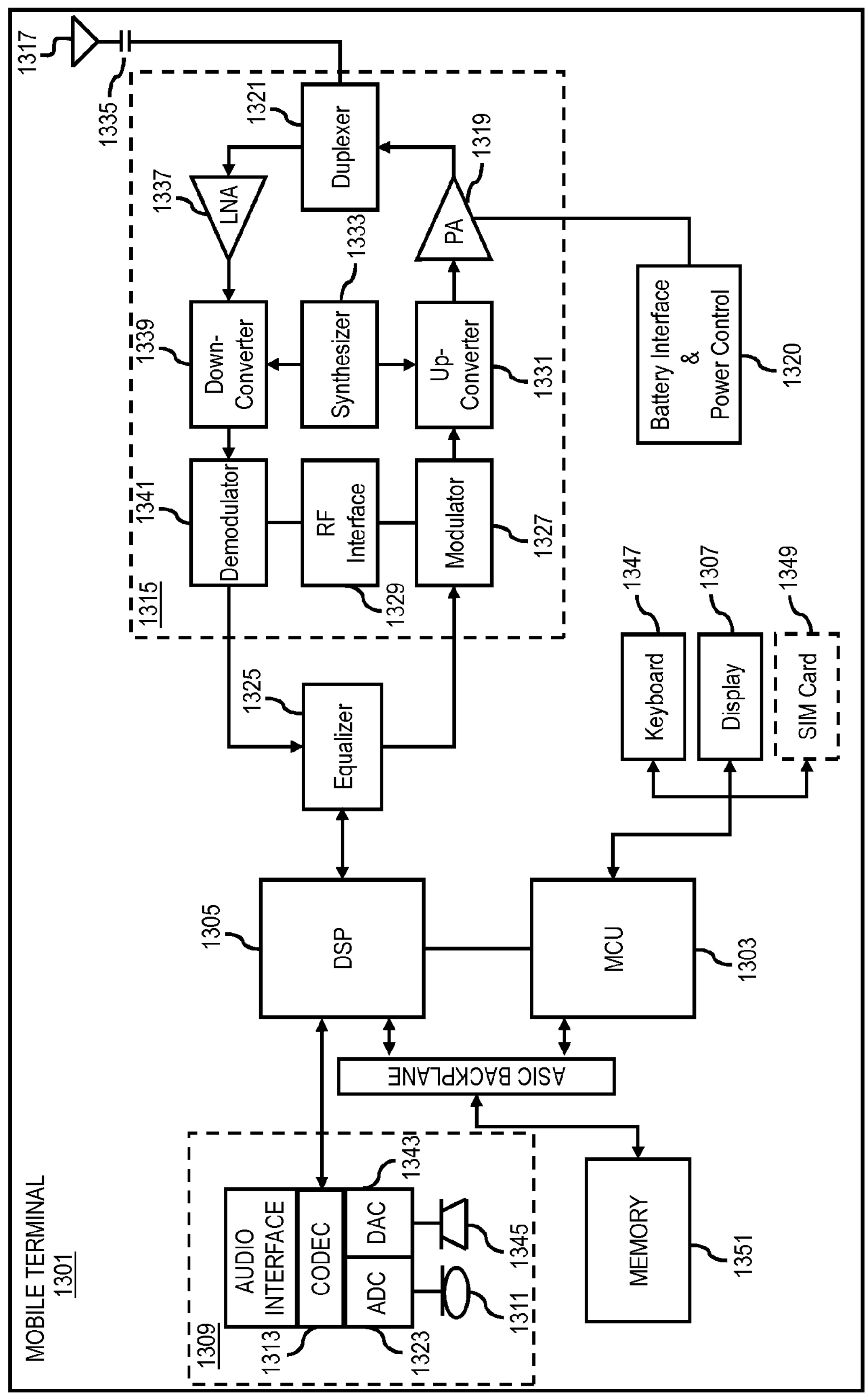
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of placing an emergency call using a key. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of placing an emergency call using a key. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to place an emergency call using a key. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

Further, one or more camera sensors 1353 may be incorporated onto the mobile station 1301 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:

sensor information to determine at least one emergency condition;

at least one determination of the sensor information from one or more sensors associated with at least one vehicle, one or more other sensors associated with the at least one key, or a combination thereof, wherein the one or more sensors associated with the at least one vehicle and the one or more other sensors associated with the at least one key exchange the sensor information via one or more short range communication means; and an initiation of at least one emergency call via the at least one key in response to the at least one emergency condition, wherein the at least one key is configured with one or more emergency phone functionalities.

2. A method of claim 1, wherein the (1) data and/or (2) information and/or (3) at least one signal are further based, at least in part, on the following:

at least one determination of a decision to initiate the at least one emergency call from at least one vehicle, the at least one key, or a combination thereof.

3. A method of claim 2, wherein the (1) data and/or (2) information and/or (3) at least one signal are further based, at least in part, on the following:

at least one determination of the decision to initiate the at least one emergency call at the at least one key if an emergency system associated with the at least one vehicle is unavailable.

4. A method of claim 1, wherein the initiation of the at least one emergency call is performed by the at least one key if one or more other emergency phone functionalities associated with at least one vehicle is unavailable.

5. A method of claim 1, wherein the sensor information includes, at least in part, location information, the method further comprising:

at least one determination of the location information based, at least in part, on cellular information associated with the one or more emergency phone functionalities of the at least one key.

6. A method of claim 1, wherein the sensor information includes, at least in part, location information, the method further comprising:

at least one determination of the location information from the one or more sensors of the at least one vehicle by causing, at least in part, a transmission of the location information from the one or more sensors to the at least one key if the at least one key is within a communication range of the at least one vehicle.

7. A method of claim 1, wherein the (1) data and/or (2) information and/or (3) at least one signal are further based, at least in part, on the following:

at least one determination of telematics information associated with the at least one emergency condition; and a storage of the telematics information at the at least one key.

8. A method of claim 1, wherein the at least one key is configured with at least one speaker, at least one microphone, or a combination thereof to support the one or more emergency phone functionalities.

9. An apparatus comprising:

at least one processor; and at least one memory including computer program code for one or more programs, the at least one memory and the computer program code configured to, with the at least one processor, cause the apparatus to perform at least the following, process and/or facilitate a processing of sensor information to determine at least one emergency condition;

determine the sensor information from one or more sensors associated with at least one vehicle, one or more other sensors associated with at least one key, or a combination thereof, wherein the one or more sensors associated with the at least one vehicle and the one or more other sensors associated with the at least one key exchange the sensor information via one or more short range communication means; and cause, at least in part, an initiation of at least one emergency call via the at least one key in response to the at least one emergency condition, wherein the at least one key is configured with one or more emergency phone functionalities.

10. An apparatus of claim 9, wherein the apparatus is further caused to:

determine a decision to initiate the at least one emergency call from at least one vehicle, the at least one key, or a combination thereof.

11. An apparatus of claim 10, wherein the apparatus is further caused to:

determine the decision to initiate the at least one emergency call at the at least one key if an emergency system associated with the at least one vehicle is unavailable.

12. An apparatus of claim 9, wherein the initiation of the at least one emergency call is performed by the at least one key if one or more other emergency phone functionalities associated with at least one vehicle is unavailable.

13. An apparatus of claim 9, wherein the sensor information includes, at least in part, location information, the method further comprising:

determine the location information based, at least in part, on cellular information associated with the one or more emergency phone functionalities of the at least one key.

14. An apparatus of claim 9, wherein the sensor information includes, at least in part, location information, the method further comprising:

determine the location information from the one or more sensors of the at least one vehicle by causing, at least in part, a transmission of the location information from the one or more sensors to the at least one key if the at least one key is within a communication range of the at least one vehicle.

15. An apparatus of claim 9, wherein the apparatus is further caused to:

determine telematics information associated with the at least one emergency condition; and cause, at least in part, a storage of the telematics information at the at least one key.

16. An apparatus of claim 9, wherein the at least one key is configured with at least one speaker, at least one microphone, or a combination thereof to support the one or more emergency phone functionalities.

* * * * *